(12) United States Patent
Kabano et al.

(10) Patent No.: US 8,566,543 B2
(45) Date of Patent: Oct. 22, 2013

(54) COMPUTER SYSTEM AND RECLAMATION CONTROL METHOD

(75) Inventors: Shigeyuki Kabano, Odawara (JP); Nobyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 13/383,087

(22) PCT Filed: Dec. 19, 2011

(86) PCT No.: PCT/JP2011/007086
§ 371 (c)(1),
(2), (4) Date: Jan. 9, 2012

(87) PCT Pub. No.: WO2013/093957
PCT Pub. Date: Jun. 27, 2013

(65) Prior Publication Data
US 2013/0159647 A1 Jun. 20, 2013

(51) Int. Cl.
*G06F 12/02* (2006.01)
*G06F 12/16* (2006.01)
(52) U.S. Cl.
USPC ............ 711/162; 711/E12.002; 711/E12.103

(58) Field of Classification Search
None
See application file for complete search history.

(56) References Cited

U.S. PATENT DOCUMENTS

| 2006/0282485 | A1 | 12/2006 | Aggarwal et al. |
| 2010/0030825 | A1 | 2/2010 | Matsuzawa |
| 2011/0138143 | A1 | 6/2011 | Seki et al. |
| 2011/0238937 | A1 | 9/2011 | Murotani et al. |

FOREIGN PATENT DOCUMENTS

| JP | 2008-146574 A | 6/2008 |
| JP | 2010-033374 A | 2/2010 |
| WO | 2009019128 A1 | 2/2009 |

*Primary Examiner* — Kevin Verbrugge
(74) *Attorney, Agent, or Firm* — Volpe and Koenig, P.C.

(57) ABSTRACT

A computer system and reclamation control method capable of effectively utilizing storage resources of a storage system even under the circumstance where the storage system is operated according to thin provisioning and a file server can obtain snapshots.
The present invention is designed so that if a block, to which a host does not refer, but reference from a snapshot remains, exists in a virtual volume of an operation volume, temporary data is written to this block; and as triggered by this writing, data before writing is saved to a difference volume, so that the reference from the snapshot to this block is released and then this block can be reclaimed.

9 Claims, 30 Drawing Sheets

FIG. 2

| PAGE NUMBER | LDEV NUMBER | REAL ADDRESS | ALLOCATION STATUS |
|---|---|---|---|
| 1 | 1 | 100000 | 1 (ALLOCATED) |
| 2 | 1 | 100100 | 0 (UNALLOCATED) |
| 3 | 2 | 200000 | 1 |
| 4 | 3 | 300000 | 1 |
| 5 | 1 | 100200 | 0 |
| 6 | 1 | 100300 | 0 |

FIG.3

| LDEV NUMBER | TYPE |
|---|---|
| 1 | SSD |
| 2 | SAS |
| 3 | SATA |
| : | : |

FIG.4

| VIRTUAL LU ADDRESS | PAGE NUMBER |
|---|---|
| 0 | 1 |
| 100 | 2 |
| 200 | - |
| : | : |

FIG.5

| REAL ADDRESS | HDD NUMBER | PHYSICAL ADDRESS |
|---|---|---|
| 10 0 | 1 | 100000 |
| 20 0 | 2 | 100100 |
| 30 0 | 3 | 200000 |
| 40 0 | 4 | 300000 |
| 50 0 | 1 | 100100 |
| 60 0 | 2 | 100200 |
| 70 0 | 3 | 200100 |
| 80 0 | 4 | 300100 |

FIG.12

| PAGE ADDRESS | STATE | ALLOCATION STATUS |
|---|---|---|
| ⋮ | ⋮ | |
| 100 | 00 | 1( ALLOCATED ) |
| 101 | 01 | 1( ALLOCATED ) |
| 102 | 10 | 1( ALLOCATED ) |
| 103 | 11 | 1( ALLOCATED ) |
| 104 | 11 | 0( UNALLOCATED ) |

FIG.13

| PAGE ADDRESS | STATE | ALLOCATION STATUS |
|---|---|---|
| ⋮ | ⋮ | |
| 100 | 11 | 0 |
| 101 | 11 | 0 |
| 102 | 11 | 0 |
| 103 | 11 | 0 |
| 104 | 11 | 0 |

FIG.15

| AFTER TRANSITION / BEFORE TRANSITION | 11 | 10 | 01 | 00 |
|---|---|---|---|---|
| 11 | NO OPERATION OR RECLAME | CREATE SNAPSHOT | WRITE DATA TO PVOL | ✕ |
| 10 | DELETE SNAPSHOT | NO OPERATION | WRITE DATA TO PVOL (AT THE TIME OF RECALL) | ✕ |
| 01 | DELETE DATA (PVOL) | ✕ | WRITE DATA TO PVOL(UPDATE AREA ON WHICH COW HAS BEEN EXECUTED) OR NO OPERATION | CREATE SNAPSHOT |
| 00 | ✕ | DELETE DATA (PVOL) | DELETE SNAPSHOT OR WRITE DATA TO PVOL (UPDATE AREA ON WHICH COW HAS NOT BEEN EXECUTED) | NO OPERATION |

FIG. 16

RECLAMATION MANAGEMENT TABLE

| PAGE ADDRESS | STATE | ALLOCATION STATUS |
|---|---|---|
| ⋮ | ⋮ | |
| 100 | 00 | 1 |
| 101 | 01→00 | 1 |
| 102 | 10 | 1 |
| 103 | 11→10 | 1 |

STATE TRANSITION TABLE

| BEFORE TRANSITION \ AFTER TRANSITION | 11 | 10 | 01 | 00 |
|---|---|---|---|---|
| 11 | NO OPERATION OR RECLAME | CREATE SNAPSHOT | WRITE DATA TO PVOL | ✕ |
| 10 | DELETE SNAPSHOT | NO OPERATION | WRITE DATA TO PVOL (AT THE TIME OF RECALL) | ✕ |
| 01 | DELETE DATA (PVOL) | ✕ | WRITE DATA TO PVOL (UPDATE AREA ON WHICH COW HAS BEEN EXECUTED) OR NO OPERATION | CREATE SNAPSHOT |
| 00 | ✕ | DELETE DATA (PVOL) | DELETE SNAPSHOT OR WRITE DATA TO PVOL (UPDATE AREA ON WHICH COW HAS NOT BEEN EXECUTED) | NO OPERATION |

FIG. 17

RECLAMATION MANAGEMENT TABLE

| PAGE ADDRESS | STATE | ALLOCATION STATUS |
|---|---|---|
| : | : | |
| 100 | 00→01 | 1 |
| 101 | 01 | 1 |
| 102 | 10→11 | 1 |
| 103 | 11 | 1 |

STATE TRANSITION TABLE

| BEFORE TRANSITION \ AFTER TRANSITION | 11 | 10 | 01 | 00 |
|---|---|---|---|---|
| 11 | NO OPERATION OR RECLAME | CREATE SNAPSHOT | WRITE DATA TO PVOL | ╳ |
| 10 | DELETE SNAPSHOT | NO OPERATION | WRITE DATA TO PVOL (AT THE TIME OF RECALL) | ╳ |
| 01 | DELETE DATA (PVOL) | ╳ | WRITE DATA TO PVOL(UPDATE AREA ON WHICH COW HAS BEEN EXECUTED) OR NO OPERATION | CREATE SNAPSHOT |
| 00 | ╳ | DELETE DATA (PVOL) | DELETE SNAPSHOT OR WRITE DATA TO PVOL (UPDATE AREA ON WHICH COW HAS NOT BEEN EXECUTED) | NO OPERATION |

FIG.18

RECLAMATION MANAGEMENT TABLE

| PAGE ADDRESS | STATE | ALLOCATION STATUS |
|---|---|---|
| : | : | |
| 100 | 00→01 | 1 |
| 101 | 01→01 | 1 |
| 102 | 10 | 1 |
| 103 | 11→01 | 1 ( or 0→1) |

STATE TRANSITION TABLE

| BEFORE TRANSITION \ AFTER TRANSITION | 11 | 10 | 01 | 00 |
|---|---|---|---|---|
| 11 | NO OPERATION OR RECLAME | CREATE SNAPSHOT | WRITE DATA TO PVOL | X |
| 10 | DELETE SNAPSHOT | NO OPERATION | WRITE DATA TO PVOL (AT THE TIME OF RECALL) | X |
| 01 | DELETE DATA (PVOL) | X | WRITE DATA TO PVOL(UPDATE AREA ON WHICH COW HAS BEEN EXECUTED) OR NO OPERATION | CREATE SNAPSHOT |
| 00 | X | DELETE DATA (PVOL) | DELETE SNAPSHOT OR WRITE DATA TO PVOL (UPDATE AREA ON WHICH COW HAS NOT BEEN EXECUTED) | NO OPERATION |

FIG.20

| I-NODE NUMBER | OWNER | ACCESS RIGHT | SIZE | LAST ACCESS DATE AND TIME | FILE NAME | REPLICATED FLAG | STUB FLAG | LINK DESTINATION | DATA BLOCK ADDRESS 1 | DATA BLOCK ADDRESS 2 | ... |
|---|---|---|---|---|---|---|---|---|---|---|---|
| | | | | | | | | | | | |
| | | | | | | | | | | | |

FIG.21

RECLAMATION MANAGEMENT TABLE

| PAGE ADDRESS | STATE | ALLOCATION STATUS |
|---|---|---|
| ⋮ | ⋮ | |
| 100 | 00→10 | 1 |
| 101 | 01→11 | 1 |
| 102 | 10 | 1 |
| 103 | 11 | 1 |

STATE TRANSITION TABLE

| BEFORE TRANSITION \ AFTER TRANSITION | 11 | 10 | 01 | 00 |
|---|---|---|---|---|
| 11 | NO OPERATION OR RECLAME | CREATE SNAPSHOT | WRITE DATA TO PVOL | × |
| 10 | DELETE SNAPSHOT | NO OPERATION | WRITE DATA TO PVOL (AT THE TIME OF RECALL) | × |
| 01 | DELETE DATA (PVOL) | × | WRITE DATA TO PVOL (UPDATE AREA ON WHICH COW HAS BEEN EXECUTED) OR NO OPERATION | CREATE SNAPSHOT |
| 00 | × | DELETE DATA (PVOL) | DELETE SNAPSHOT OR WRITE DATA TO PVOL (UPDATE AREA ON WHICH COW HAS NOT BEEN EXECUTED) | NO OPERATION |

FIG.22

RECLAMATION MANAGEMENT TABLE

| PAGE ADDRESS | STATE | ALLOCATION STATUS |
|---|---|---|
| : | : | |
| 100 | 00 | 1 |
| 101 | 01 | 1 |
| 102 | 10→01 | 1 |
| 103 | 11 | 1 |

STATE TRANSITION TABLE

| BEFORE TRANSITION \ AFTER TRANSITION | 11 | 10 | 01 | 00 |
|---|---|---|---|---|
| 11 | NO OPERATION OR RECLAME | CREATE SNAPSHOT | WRITE DATA TO PVOL | |
| 10 | DELETE SNAPSHOT | NO OPERATION | WRITE DATA TO PVOL (AT THE TIME OF RECALL) | |
| 01 | DELETE DATA (PVOL) | | WRITE DATA TO PVOL(UPDATE AREA ON WHICH COW HAS BEEN EXECUTED) OR NO OPERATION | CREATE SNAPSHOT |
| 00 | | DELETE DATA (PVOL) | DELETE SNAPSHOT OR WRITE DATA TO PVOL (UPDATE AREA ON WHICH COW HAS NOT BEEN EXECUTED) | NO OPERATION |

FIG.23

RECLAMATION MANAGEMENT TABLE

| PAGE ADDRESS | STATE | ALLOCATION STATUS |
|---|---|---|
| ⋮ | ⋮ | |
| 100 | 00 | 1 |
| 101 | 01→11 | 1→0 |
| 102 | 10 | 1 |
| 103 | 11→11 | 1→0 |

STATE TRANSITION TABLE

| BEFORE TRANSITION \ AFTER TRANSITION | 11 | 10 | 01 | 00 |
|---|---|---|---|---|
| 11 | NO OPERATION OR RECLAME | CREATE SNAPSHOT | WRITE DATA TO PVOL | ✕ |
| 10 | DELETE SNAPSHOT | NO OPERATION | WRITE DATA TO PVOL (AT THE TIME OF RECALL) | ✕ |
| 01 | DELETE DATA (PVOL) | ✕ | WRITE DATA TO PVOL (UPDATE AREA ON WHICH COW HAS BEEN EXECUTED) OR NO OPERATION | CREATE SNAPSHOT |
| 00 | ✕ | DELETE DATA (PVOL) | DELETE SNAPSHOT OR WRITE DATA TO PVOL (UPDATE AREA ON WHICH COW HAS NOT BEEN EXECUTED) | NO OPERATION |

COMPUTER SYSTEM AND RECLAMATION CONTROL METHOD

TECHNICAL FIELD

The present invention relates to a computer system for providing storage areas to a file server. Specifically speaking, the invention relates to a computer system designed to be capable of efficiently using storage resources of the storage system by preventing excessive storage areas from being left allocated from the storage system to a volume(s) of the file server. This invention also relates to a method for efficiently executing reclamation to release storage blocks from allocation to the volumes.

BACKGROUND ART

As an example of conventional technology relating to the present invention, there is a computer system described in Japanese Patent Application Laid-Open (Kokai) Publication No. 2008-146574. This patent literature discloses that when resident software of a host computer cancels the correspondence relationship between data in a file system and areas (pages) of virtual volumes, specified data is written to an area of a virtual volume and the area of the virtual volume to which the specified data is written is then returned to a pool by a storage control device.

Japanese Patent Application Laid-Open (Kokai) Publication No. 2010-0033374 which is another conventional technology discloses that when deleting a file or a snapshot, a file management device judges whether or not data to be deleted is shared with another snapshot; and if the data to be deleted is not shared, zero data is written to an area of the data to be deleted.

CITATION LIST

Patent Literature

PTL 1: Japanese Patent Application Laid-Open (Kokai) Publication No. 2008-146574
PTL 2: Japanese Patent Application Laid-Open (Kokai) Publication No. 2010-033374

SUMMARY OF INVENTION

Technical Problem

The file server provides an operation volume (PVOL: primary volume) to a host. When the host makes write access to the PVOL, the storage system writes data to a storage block allocated to the PVOL.

Thin provisioning is known as one method executed by the storage system for al-locating a storage area to the PVOL of the file server. Thin provisioning does not allocate a storage area with a certain capacity to the PVOL from the beginning, but it is a method for allocating a storage block every time the host makes write access to the PVOL.

The storage system defines a virtual logical unit (virtual LU) for the PVOL in order to achieve thin provisioning. According to this invention, the storage system adopts a method for allocating a block of a fixed length called a page from logical volumes (LDEV) accumulated in a pool to a virtual volume every time access is made from a host computer. Since the host always refers to the PVOL, the storage system allocates high-speed devices such as SAS or SSD to the virtual volume.

The file server also has a function storing a data image of the PVOL at a certain point in time as a snapshot in order to recover data of the PVOL. The storage system saves old data for the snapshot to a difference volume (DVOL), which is composed of low-speed, large-capacity, and inexpensive devices such as SATA, in order to avoid wasting of high-speed devices.

The snapshot saves pre-update old data to the DVOL at the point in time when an update of the PVOL occurs by means of copy-on-write (COW). The file server provides the snapshot as a virtual volume to the host. Therefore, the file server recreates all pieces of data at the point in time of creation of the snapshot for each block from the DVOL or the PVOL.

Regarding thin provisioning, if the host does not refer to a page, the computer system can continue executing processing for releasing a page, which has been allocated to a virtual volume once, from allocation to the virtual volume and returning it to the pool in order to efficiently utilize the storage resources. This processing is called reclamation.

Meanwhile, even if reference from the file system to an area of the PVOL, which is not updated, is canceled after creation of a snapshot due to, for example, deletion of a file, reference from a snapshot(s) to this area still remains. In this case, the file server cannot execute reclamation. This is because reclamation would destroy the snapshot(s). Therefore, the problem is that expensive devices such as SAS or SSD are wasted in order to maintain snapshots.

So, it is an object of the present invention to provide a computer system and reclamation control method capable of effectively utilizing storage resources of a storage system even under the circumstance where the storage system is operated according to thin provisioning and a file server can obtain snapshots.

Solution to Problem

In order to achieve the above-described object, a computer system according to the present invention is characterized in that if a block, to which reference is not made from a host, but reference from a snapshot remains, exists in a virtual volume of an operation volume, temporary data is written to this block; and as triggered by this writing, data before writing is saved to a difference volume, so that the reference from the snapshot to this block is released and then this block can be reclaimed.

Advantageous Effects of Invention

According to the present invention, a computer system and reclamation control method capable of effectively utilizing storage resources of a storage system can be provided even under the circumstance where the storage system is operated according to thin provisioning and a file server can obtain snapshots.

BRIEF DESCRIPTION OF DRAWINGS

FIG. 2 is an example of a page management table.
FIG. 3 is an example of a device management table.
FIG. 4 is an example of a virtual LU configuration table.
FIG. 5 is an example of a real address management table.

FIG. 12 is an example of a management table for judging a storage area to be reclaimed, to which reference is made from only a snapshot, as a result of causing the occurrence of copy-on-write on respective storage areas of the PVOL.

FIG. 13 is a reclamation management table immediately after the file server creates a file system.

FIG. 15 is a table summarizing the relationship between a state before and after the transition of the reference flag and operation that triggers the state transition.

FIG. 16 explains an update of the reclamation management table as a result of snapshot creation in association with the state transition diagram.

FIG. 17 explains an update of the reclamation management table as a result of snapshot deletion in association with the state transition diagram.

FIG. 18 explains an update of the reclamation management table as a result of write processing on the PVOL in association with the state transition diagram.

FIG. 20 is a block diagram of an i-node management table that has a stub flag indicating whether or not a file has been converted into stub in order to deal with file stub conversion, a link destination to recall data, and a storage area for a replicated flag.

FIG. 21 explains an update of the reclamation management table in the process of file conversion into stub in association with the state transition diagram.

FIG. 22 explains an update of the reclamation management table as a result of recall from the archive system in association with the state transition diagram.

FIG. 23 explains an update of the reclamation management table in the process of page reclamation in association with the state transition diagram.

DESCRIPTION OF EMBODIMENTS

Figure 1:
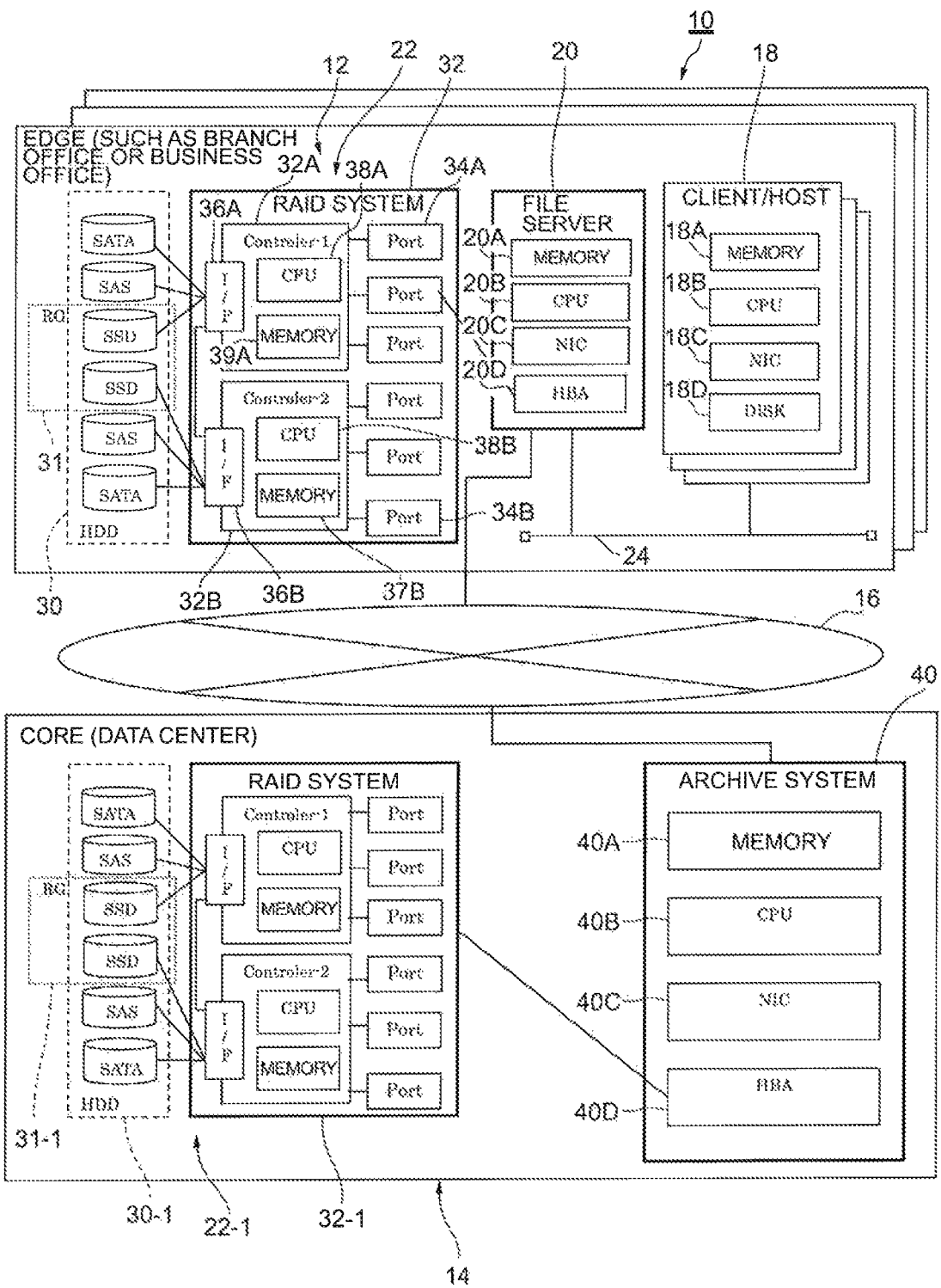
FIG. 1 is a block diagram of an operation system equipped with a computer system according to an embodiment of the present invention.

Next, an embodiment of the present invention will be explained. FIG. 1 shows a block diagram of an operation system 10 equipped with a computer system according to an embodiment of the present invention. The operation system 10 is configured as a system in which a plurality of edges 12 are connected to a core 14 via a network 16 such as a SAN.

The edge 12 is a system of a base such as a branch office or a business office where users actually conduct their business; and the core 14 is a system of a base for col-lectively managing servers and storage systems used by, for example, companies or providing cloud services.

The edge 12 includes a client/host 18, a file server 20, and a storage system 22. The client/host 18 reads programs such as an OS, which are stored in a disk 18D, to a memory 18A and has a CPU 18B execute the programs. Furthermore, the client/host 18 communicates with the file server 20 via a network 24 by using an NIC (Network Interface Card) 18C and makes file-based access (or access according to a file protocol [such as NFS or CIFS]) to the file server 20.

The file server 20 reads programs such as an OS to a memory 20A and has a CPU 20B execute the programs. Furthermore, the file server 20 communicates with the client/host 18 via the network 24 by using an NIC (Network Interface Card) 20C and communicates with an archive system (which belongs to the core 14) described later via the network 16. Also, the file server 20 is connected to the storage system 22 via an HBA (Host Bus Adaptor) 20D and makes volume-level access to the storage system 22.

The storage system 22 includes a storage unit 30 equipped with a plurality of storage devices, and a RAID system 32 as a storage controller. The storage unit 30 includes high-speed storage devices such as SAS or SSD and inexpensive low-speed storage devices such as SATA.

The RAID system 32 is composed of dual controllers (controller 1: 32A; and controller 2: 32B). A plurality of ports 34A, 34B are connected to each controller; and each controller includes an interface 36A, 36B with the storage unit 30, a CPU 38A, 38B, and a memory 37A, 37B.

The port 34A (34B) of the RAID system 32 receives an I/O request from the HBA 20D of the file server 20 and executes I/O on the storage unit 30 via the interface 36A (36B) under the control of the CPU 38A (38B) for the controller 1 (controller 2).

The plurality of HDD devices are managed as one RAID group (RG) and one logical volume (LDEV) is created by cutting out part of the RG and is provided as an LU to the file server. FIG. 1 shows that two SSDs constitute RG 31. Illustration of RGs with other configurations has been omitted. Pages are allocated from an RG composed of high-speed devices to the PVOL. Pages are allocated from an RG composed of low-speed devices to the DVOL.

The core 14 includes a storage system 22-1 configured in the same manner as the edge 12, and an archive system 40. The storage system 22-1 includes a RAID system 32-1 and a storage unit 30-1. 31-1 is an RG. The RAID system 32-1 is configured in almost the same manner as that of the RAID system 32 of the edge 12, so an ex-planation of the RAID system 32-1 has been omitted.

The archive system 40 stores programs such as an OS in a memory 40A and has a CPU 40B execute the programs.

Furthermore, the archive system 40 communicates with the file server 20 via the network 16 by using an NIC (Network Interface Card) 40C. The archive system 40 is connected to the RAID system 32-1 via an HBA (Host Bus Adaptor) 40D and makes volume-level access.

The storage system of the edge 12 and the storage system of the core are configured in the same manner, but the former storage system is of a mid-range class type and the latter storage system is of a high-end type. Files to which the client/host 18 refers are managed by the file server 20 and stored in the storage system 22.

File data in the storage system 22 is replicated in the archive system 40 of the core 14. Furthermore, the file data in the storage system 22 is periodically migrated to the archive system. If data of a file to which the client/host 18 refers exists in the core 14, the file server 20 recalls the file data from the archive system 40.

Thin provisioning is applied to the storage system of the edge 12 as described earlier in order to effectively utilize the storage devices. Thin provisioning may be applied to the core. Thin provisioning treats an RG composed of a plurality of HDDs as one LDEV and manages it in a pool. One or more LDEVs exist in the pool and each LDEV is managed on a page (storage area with a fixed length) basis. The allocation status of pages to virtual volumes is managed, using management tables.

The management tables for managing thin provisioning include a page management table, a device management table, a virtual LU configuration table, and a real address management table. These management tables are located in a memory contained in a controller in the RAID system 32 (32-1). If a write request which designates an LDEV number and a real address is made to the controller for the RAID system, the controller refers to the management tables created for each LDEV, designates the physical address of the HDD, and writes data there.

FIG. 2 is an example of the page management table. Each page is assigned a unique number and the page number is associated with an LDEV number and a real address in the relevant LDEV.

FIG. 3 is an example of the device management table. The device management table specifies the correspondence relationship between the LDEV number and the device type in order to define the LDEV type.

FIG. 4 is an example of the virtual LU configuration table. A virtual LU exists as a result of mapping a virtual LU address and the page number.

FIG. 5 is an example of the real address management table. The real address management table stores the real address in the LDEV, an HDD number indicating the HDD where the real address exists, and a physical address corresponding to the real address of the HDD. Incidentally, FIG. 5 shows distributed writing (striping case).

Figure 6:
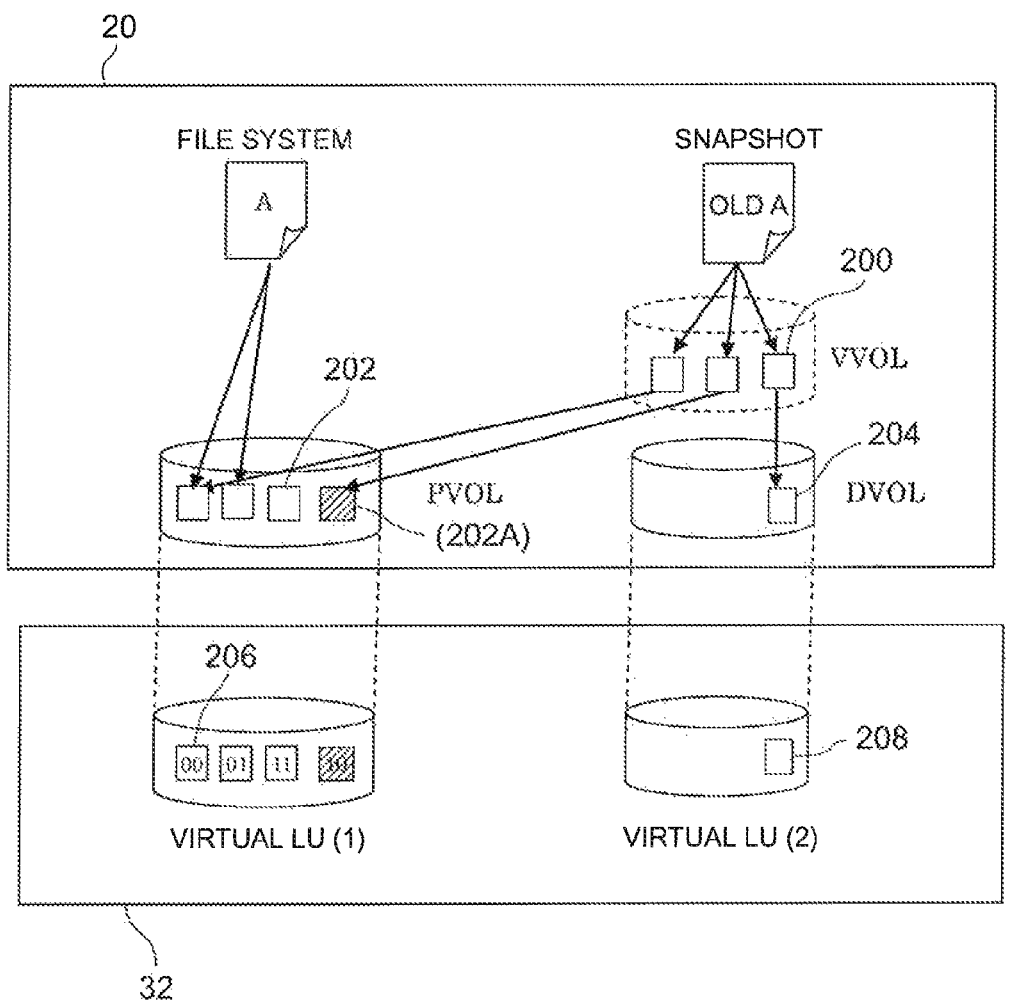
FIG. 6 is a block diagram for explaining thin provisioning.

FIG. 6 is a block diagram of thin provisioning. FIG. 6 shows the correspondence rela-tionship between volumes in the file server 20 and the RAID system 32. The file system and a snapshot(s) exist in a file system layer of the file server 20 as described earlier. File system (A) is configured in the PVOL. The old state of file A (old A) which is a snapshot exists in a virtual volume (VVOL). VVOL blocks 200 are allocated to PVOL blocks 202 or DVOL blocks 204.

The RAID system 32 provides a virtual LU (1) and a virtual LU (2) to the file server 20. The virtual LU (1) serves to provide a storage capacity to the PVOL and the virtual LU (2) serves to provide a storage capacity to the DVOL. However, the storage capacity itself is virtual and a real storage area is not directly provided from the virtual LUs to the PVOL and the DVOL. A block (page) which is a real storage area is allocated from the pool to the block address of the virtual LU. A page 206 of the virtual LU (1) is allocated to the PVOL block 202 and a page 208 of the virtual LU (2) is allocated to the DVOL block 204.

When the RAID system 32 receives a write request from the host to the virtual LU (1) via the PVOL, it checks the virtual LU address received from the host against the virtual LU configuration table and identifies the page number. If the identified page number has already been set, the RAID system 32 obtains the LDEV number and the real address by using the page management table and stores data at the real address.

If the page number has not been set, the RAID system searches the page management table for the page number whose allocation status is UNALLOCATED, obtains the LDEV number and the real address corresponding to that page number, writes data there, and updates the page management table and the virtual LU configuration table.

A storage area is allocated from high-speed storage devices with high performance such as SSD or SAS to the virtual LU corresponding to the PVOL; and a storage area is allocated from low-speed storage devices with low performance such as SATA to the virtual LU corresponding to the DVOL.

Since the virtual LU (1) corresponds to the PVOL on a one-to-one basis and the virtual LU (2) corresponds to the DVOL on a one-to-one basis, the block address of the PVOL becomes the page address of the corresponding virtual LU (1) and the block address of the DVOL becomes the page address of the corresponding virtual LU (2).

Referring to FIG. 6, the snapshot (VVOL) refers to a block of the PVOL represented by the reference numeral 202A, but this block is an area to which the file system does not refer. If the file server 20 or the storage system 22 executes reclamation by assuming that there will be no problem even if no reference is made from the PVOL to this page, the snapshot will be destroyed. So, reclamation is not executed on this area according to the conventional technology. However, with the computer system according to the present invention, this area can be reclaimed as described later without destroying the snapshot.

Figure 7:
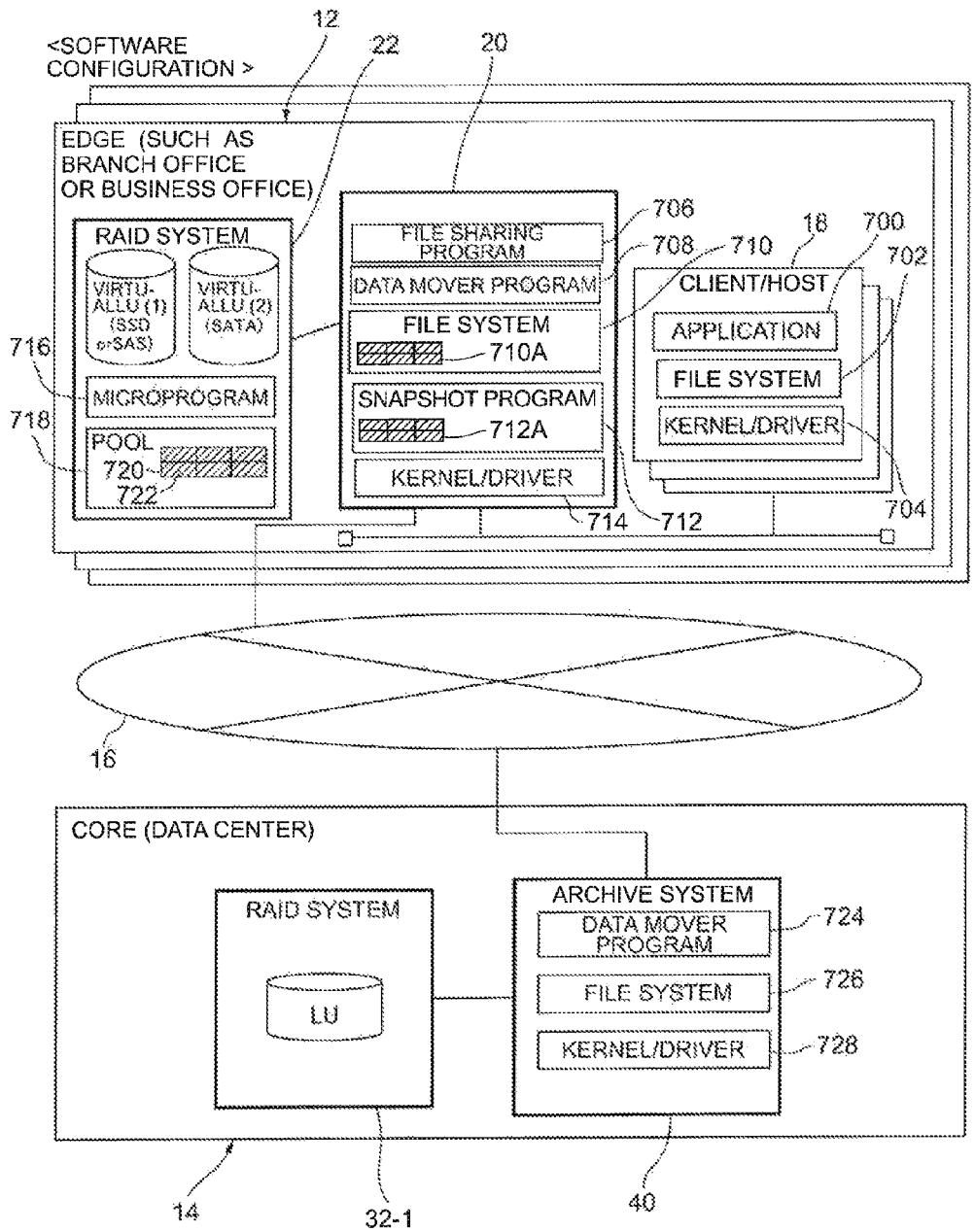
FIG. 7 is a block diagram showing the software configuration of the computer system shown in FIG. 1.

Next, the software configuration of the computer system according to the present invention will be shown. FIG. 7 is a block diagram of the software configuration. A control function of the file server 20 of the edge 12 is constituted from a file sharing program 706, a data mover program 708, a file system 710, a snapshot program 712, and a kernel/driver 714.

The file sharing program 706 provides a file sharing service between the client(s) and the host by using a communication protocol such as CIFS or NFS.

The data mover program 708 sends a target file from the file server 20, which is a migration (replication) source, to the archive system 40 which is a migration (replication) destination; and the archive system 40 receives the file data and stores the file data in the RAID system 32. If the file server 20 receives access from an upper-level program to a migrated file, the data mover program 708 of the file server obtains data of the file via the data mover program 724 of the archive system.

When the file system 710 receives a file-based read/write request from the host, it refers to the i-node management table 710A, converts a file path name of an access location into a block address (address of the relevant virtual LU), and reads data from or writes data to the RAID system.

The microprogram 716 of the controller for the RAID system 32 which has received the virtual LU address refers to the virtual LU configuration table (FIG. 4) and converts the block address into the page number. Furthermore, the microprogram 716 checks the page number against the page management table (FIG. 2) and the real address management table (FIG. 5) and identifies the LDEV number and the real address; and if an I/O processing request is issued to the microprogram 716, the LDEV number and the real address are converted into the HDD number and the physical address and data is read or written.

Incidentally, the reference numeral 724 represents a data mover program of the archive system, the reference numeral 726 represents a file system of the archive system, and the reference numeral 728 represents a kernel/driver of the archive system.

The snapshot program 712 obtains snapshots of a plurality of generations of the PVOL or deletes the snapshots. A method for managing difference data when obtaining snapshots of a plurality of generations will be explained with reference to the relevant drawings. For ease of explanation, the maximum number of blocks in the PVOL and DVOL are eight and the maximum number of snapshot generations is four. A snapshot management table 712A is required in order to manage snapshots of a plurality of generations. The snapshot management table manages whether or not COW has occurred and a save location address in the DVOL with respect to each snapshot of each generation. The DVOL generated by writing data to the PVOL and an update of the snapshot management table will be explained below step by step.

Figure 8:
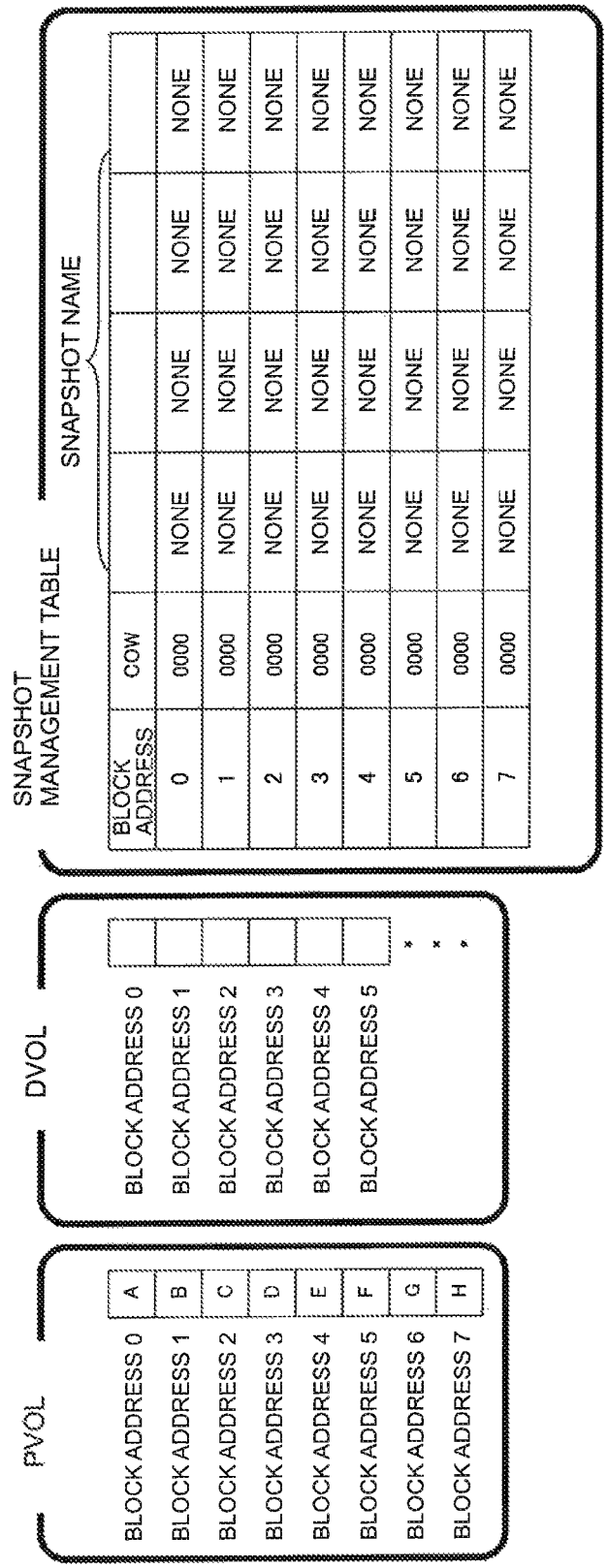
FIG. 8 is a diagram showing the relationship between block diagrams of re-spective data images of the PVOL and the DVOL and a snapshot management table before obtaining a snapshot.

FIG. 8 shows block diagrams of respective data images of the PVOL and the DVOL and the snapshot management table before obtaining a snapshot. A plurality of block addresses of the PVOL store data A, B, C, D, E, F, G, H, I, respectively.

Figure 9:
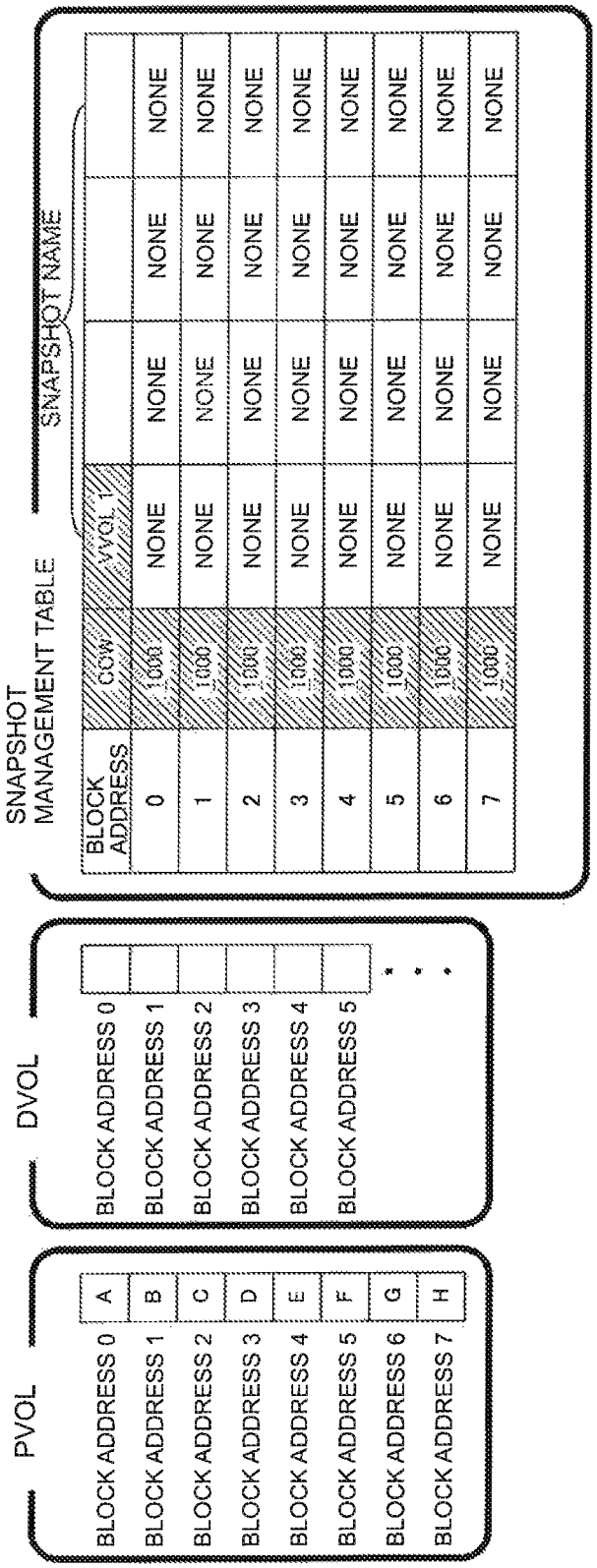
FIG. 9 is a diagram showing the relationship between block diagrams of re-spective data images of the PVOL and the DVOL and the snapshot management table when a first-generation snapshot is obtained.

FIG. 9 shows block diagrams of respective data images of the PVOL and the DVOL and the snapshot management table after obtaining a first-generation snapshot. After receiving a request to obtain a first snapshot (VVOL1) from the upper-level program, the snapshot program 712 turns on the leftmost bit in a COW field and sets [1] there in the snapshot management table. The leftmost bit of the COW field corresponds to VVOL1 (first-generation snapshot). FIG. 9 shows that the position where the bit in the COW field is on [1] requires copy-on-write.

Figure 10:
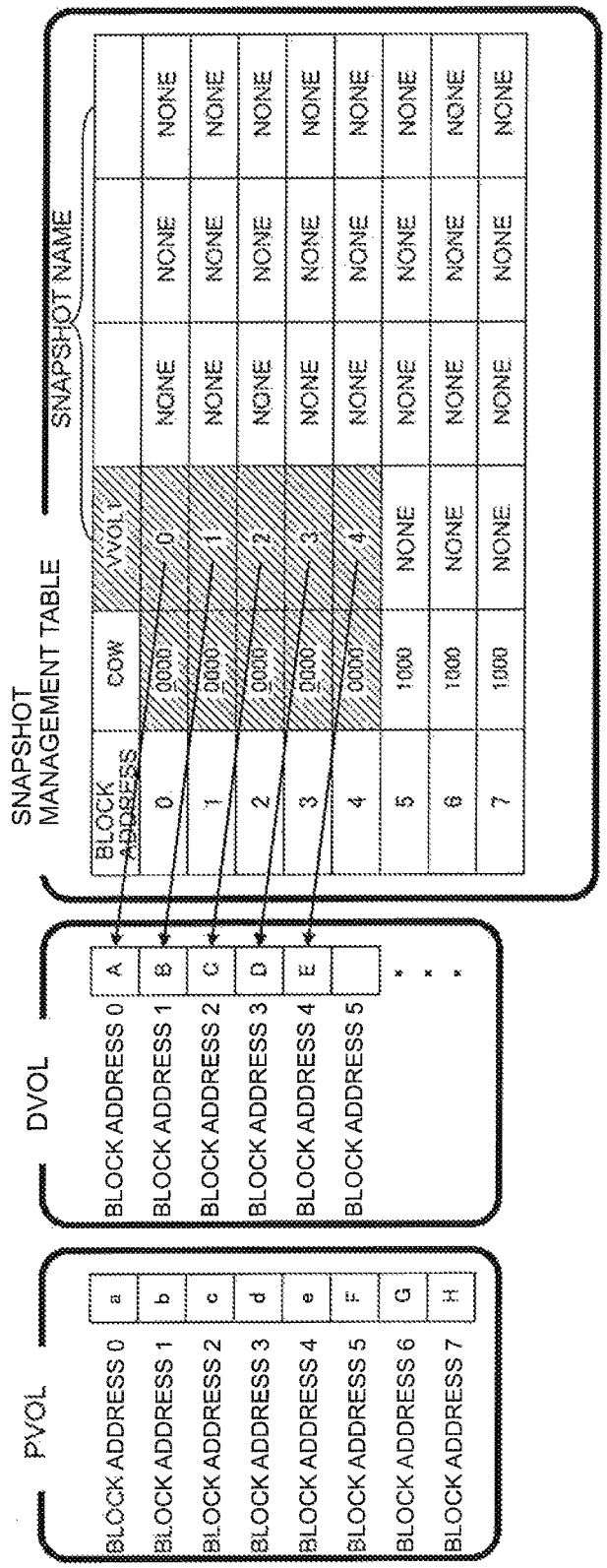
FIG. 10 is a diagram showing the relationship between block diagrams of re-spective data images of the PVOL and the DVOL and the snapshot management table when the PVOL is updated as a result of access from the host.

FIG. 10 shows block diagrams of respective data images of the PVOL and the DVOL and the snapshot management table when the PVOL is updated as a result of access from the host. The block addresses 0 to 4 of the PVOL are updated to "a, b, c, d, e" re-spectively. Pre-update old data A, B, C, D, E are saved to the DVOL and the block addresses of the DVOL are stored in VVOL1 in the snapshot management table. The leftmost bit of the COW field (0 to 4) is turned off and [0] is set, so that copy-on-write will not be executed thereafter.

Figure 11:
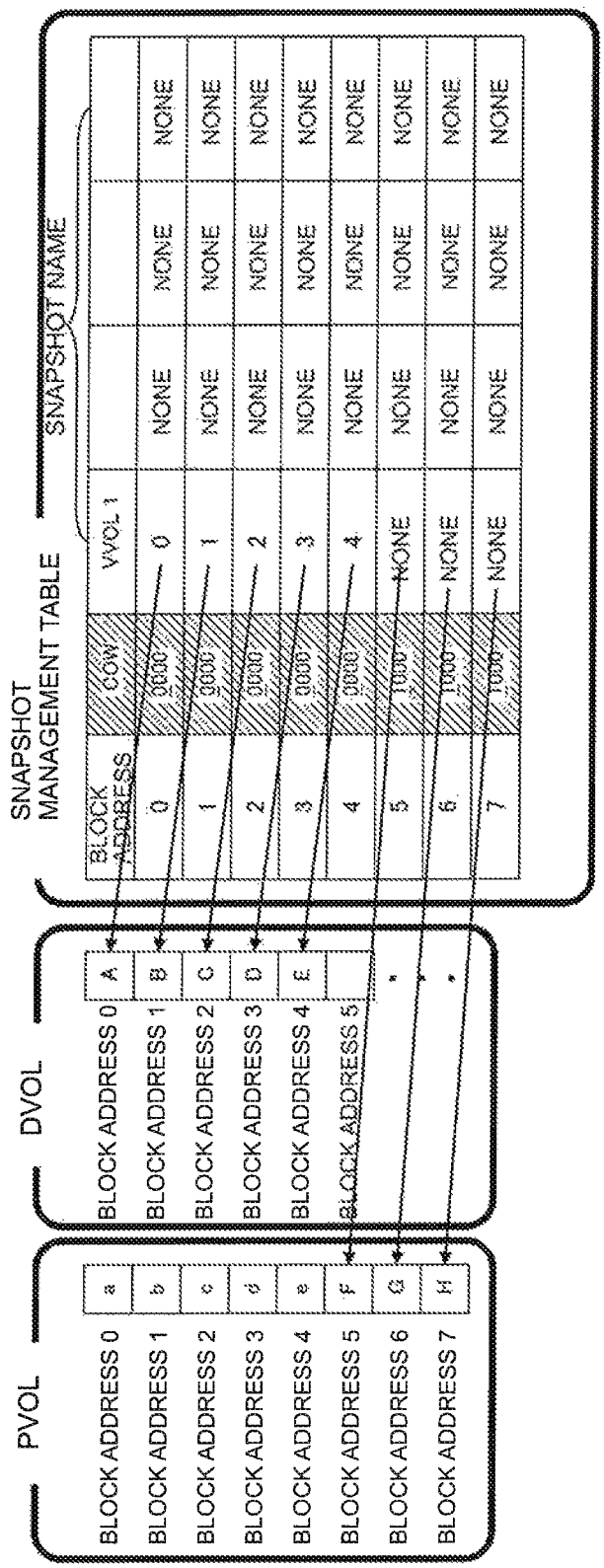
FIG. 11 is a diagram showing the relationship between block diagrams of re-spective data images of the PVOL and the DVOL and the snapshot management table when the host computer refers to a snapshot.

FIG. 11 shows block diagrams of respective data images of the PVOL and the DVOL and the snapshot management table when the host computer refers to a snapshot. Regarding the snapshot management table, the snapshot program reads the COW bit of a snapshot to which it attempts to refer, in the order of the block addresses (0 to 7). For example, when referring to VVOL1, the snapshot program refers to the leftmost bit. If the bit is turned off and is [0], the snapshot program reads data from the DVOL. If the bit is turned on and is [1], this means that copy-on-write has not been executed, so that the snapshot program reads data from the PVOL. The snapshot program reads data from all the blocks and recreates all pieces of data (A to H) of the snapshot (VVOL1).

Next, an improvement of how to have information about how reference is made from the file system and a snapshot(s) to a data storage area of the PVOL, reflected in reclamation will be explained. According to the present invention, a 2-bit flag is set. This flag will be hereinafter referred to as the reference flag (related to reference from the file system and the snapshot) for the convenience of explanation. The reference flag is a combination of 2-bit data by which it notifies a reclamation program of the file system 710 for the file server 20 of the following state. The reclamation program controls reclamation.

A flag [00] corresponds to a state where both the file system and the snapshot refer to the relevant storage area of the PVOL.

A flag [01] corresponds to a state where the file system refers to the relevant storage area of the PVOL, while the snapshot does not refer to that storage area of the PVOL.

A flag [10] corresponds to a state where the file system does not refer to the relevant storage area of the PVOL, while the snapshot refers to that storage area of the PVOL. Conventionally, a page corresponding to the state of this flag is not reclaimed; however, the present invention is designed as described later so that the file server 20 implements forced execution of copy-on-write by writing temporary data to this page and releases reference from the snapshot, thereby making it possible to apply reclamation. Since the file system refers to the temporary data, a block of the temporary data may be released from reference from the file system after the reference to the temporary data is made once.

A flag [11] corresponds to a state where both the file system and the snapshot do not refer to the relevant storage area of the PVOL. A page corresponding to the storage area of the PVOL can be reclaimed.

The reference flag is decided as shown in FIG. 6 for each page of the virtual LU (1) corresponding to each block of the PVOL as shown in FIG. 6 in accordance with the state of mapping from the file system and the snapshot to the blocks of the PVOL.

The file server 20 causes the execution of copy-on-write on each storage area of the PVOL and creates a management table for judging whether a storage area to which only the snapshot refers should be reclaimed. FIG. 12 is an example of this management table. This management table will be hereinafter referred to as the reclamation management table. An entry of the table is set for each page. The reference flag and the allocation status of the relevant page to the virtual LU are recorded for each page. The allocation status means the status indicating whether or not a page is allocated from an LDEV 722 (see FIG. 7) of the pool 720 to a virtual LU.

For reference, FIG. 13 shows a state of the reclamation management table immediately after the file server 20 creates the file system, that is, in a state where a snapshot has not been obtained and the file data has never been stored in the PVOL.

Figure 14:
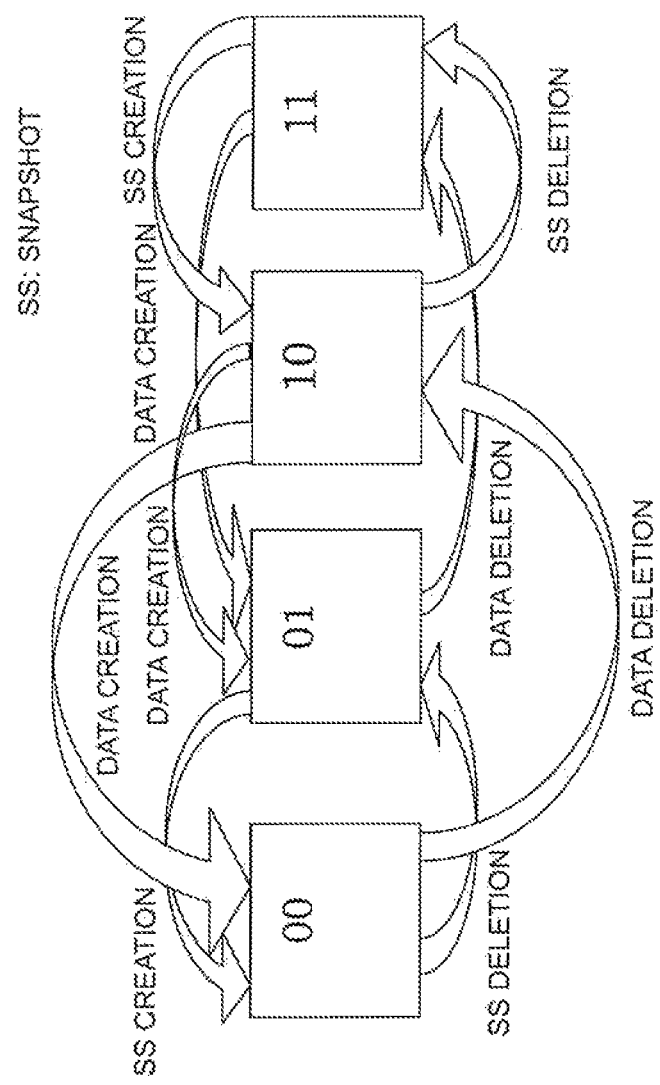
FIG. 14 a block diagram for explaining the process of state transition of a reference flag indicating a state of reference from the file system and a snapshot(s) to pages.

The aforementioned reference flag causes state transition of the 2-bit combinations by means of data creation for a page, data deletion, snapshot (SS) creation, and snapshot deletion. FIG. 14 is a block diagram for explaining the state transition with respect to the reference flag.

FIG. 15 summarizes the state before and after the transition of the reference flag and the operation which triggers the state transition, in a table format. This table will be hereinafter referred to as the state transition table. The reclamation program refers to the state transition table, determines the reference flag after the transition based on the present state (before the transition) and the operation, which has occurred, and updates the reclamation management table based on the determined reference flag.

Next, how the reclamation management table will change in accordance with operation patterns of the file server 20 will be explained. Firstly, a case of snapshot ac-quisition will be explained. After the snapshot program 712 in the file server receives a snapshot acquisition request from the upper-level program, the snapshot program sets the snapshot name to a column in the snapshot management table 712A and turns on the COW bit for all the addresses. Then, the reclamation program of the file system 710 checks the state transition table against the reclamation management table and updates the reclamation management table.

FIG. 16 is a diagram for explaining processing for updating the reclamation management table. When the snapshot program 712 creates a new snapshot for a page whose reference flag is [11], it determines the reference flag of that page to be [10] based on the state transition table and updates the reclamation management table. Similarly, a page whose reference flag is [01] is updated to [00].

Secondly, the snapshot deletion will be explained. After the snapshot program 712 receives a snapshot deletion request from the upper-level program, the snapshot program 712 checks all addresses in the snapshot management table 712A against the state transition table and the reclamation management table, updates the state of the reclamation management table as shown in FIG. 17, and deletes the relevant column from the snapshot management table 712A. If the snapshot is deleted, the reclamation management program changes the second bit of the reference flag to [1] (no reference is made from the snapshot) with respect to a page to which the reference flag with the second bit [0] (reference is made from the snapshot) is set.

Thirdly, I/O processing on the file system or the snapshot will be explained. After receiving a file-based I/O request from the upper-level program, the file system 710 refers to the i-node management table 710A, identifies a file block, which is an access target, and issues a volume-based I/O request to a logical volume layer (logical volume manager).

If the access destination to the file system is the PVOL and the logical volume manager receives a read request from the file system, the logical volume manager reads data from the relevant block of the PVOL and returns it to the file system. In a case of a write request, the logical volume manager judges whether or not copy-on-write has been executed on the relevant block address of the PVOL. If copy-on-write has been executed on the relevant block address of the PVOL, the logical volume manager requests that the microprogram 716 of the RAID system should write data to the relevant address; and if copy-on-write has not been executed on the relevant block address of the PVOL, the logical volume manager requests that the snapshot program 712 should execute copy-on-write. After writing of data to the PVOL is executed, the reclamation program checks the state transition table against the reclamation management table and updates the state of the reference flag in the reclamation management table.

FIG. 18 shows a combination of the state transition table and the reclamation management table for explaining the process of updating the reference flag based on write processing on the PVOL. The reclamation program selects the operation to write data to the PVOL from the state transition table, selects the reference flag before the transition and the reference flag after the transition corresponding to this operation, and updates the reclamation management table based on the above selection. Specifically speaking, when the file system executes writing of data to the PVOL, the reclamation management program changes the first bit of the reference flag to [0] (reference is made from the file system) with respect to a page to which the reference flag with the first bit [1] (no reference is made from the file system) is set. Then, the snapshot program executes COW and changes the second bit of the reference flag to [11] (no reference is made from the snapshot) with respect to a page to which the reference flag with the second bit [0] (reference is made from the snapshot) is set. Therefore, the page whose reference flag is [00] is updated to the reference flag [01] and the page whose reference flag is [11] is updated to the reference flag [01]. The page whose reference flag is [01] remains to be the reference flag [01].

Since recall data as temporary data is stored in the page (allocated) whose reference flag is [10] as described later, writing of data to the PVOL will not be executed. Therefore, the reference flag will not be changed.

If the access request is made to request writing of data to a snapshot, the logical volume manager returns an error response to the upper-level program in consideration of the fact that the snapshot processing program is premised on a read-only attribute of snapshots. If the access request is made to request data reading, the logical volume manager checks the block address included in the access request against the snapshot management table, judges whether the relevant data is stored in the PVOL or the DVOL, issues a data acquisition request to the RAID system, and returns the obtained data to the upper-level program. The reclamation management table will not be updated in the process of the above-described processing.

Figure 19:
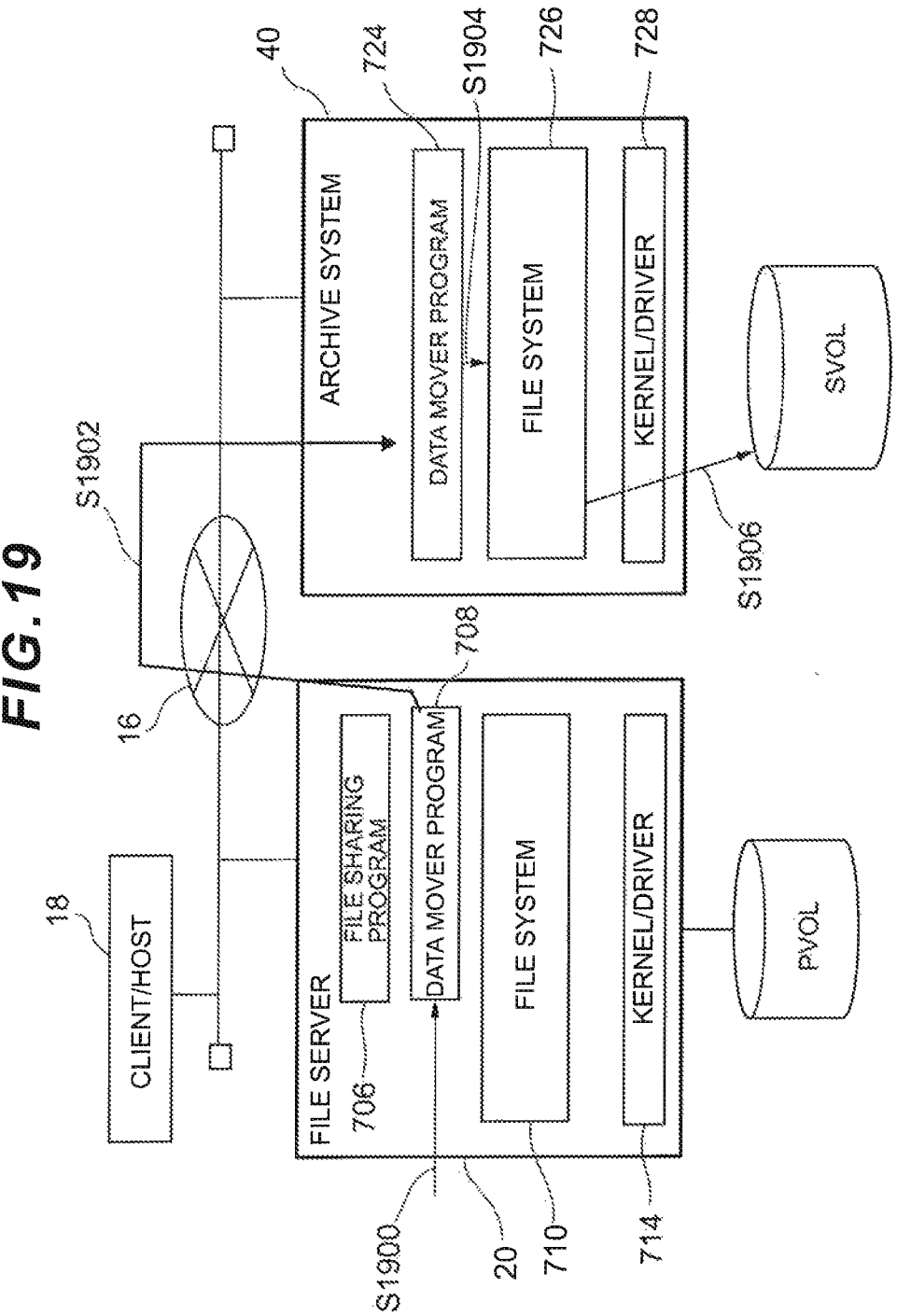
FIG. 19 is a block diagram of the file server and an archive system, showing the operation of replication and migration.

Fourthly, replication of a file in the file server 20 to the archive system 40 and file data migration will be explained. FIG. 19 is a block diagram of the file server 20 and the archive system 40, showing the operation of replication and migration.

When the data mover program 708 of the file server 20 receives a replication request from the upper-level program (S1900), it transfers a file(s) stored in the file server to the archive system 40 (S1902). Types of this transfer are new/synchronous replication. The file system 710 manages a transfer source file as being in a replicated state. Incidentally, the replicated state may be managed by metadata of the i-node management table or by a list in which replicated file names are written.

When the data mover program 724 of the archive system 40 receives the replication target file, it delivers the file to the file system 726 (S1904). The file system 726 manages the replication target file, accesses a secondary volume (SVOL) (S1906), and stores data of the replication target file in the SVOL.

If an update of the replicated file occurs, the data mover program 708 retransfers the updated file to the data mover program 724 of the archive system in order to synchronize with the replicated file (S1902). The updated file may be managed by using a synchronization required flag of metadata information with respect to whether syn-chronous transfer is required or not; or the updated file may be managed as a file requiring synchronization by using a list.

If a first condition defined by, for example, the remaining capacity of the file system and a threshold value is satisfied periodically, that is, if the storage capacity of the storage system 22 which can be allocated to the file system becomes short, the file system 710 selects a migration candidate from replicated files; and then if a second condition is also satisfied, for example, the last access date and time is older than a threshold value, the file system 710 converts the file, which is the migration candidate, into stub, thereby completing migration of the file data.

The file stub conversion is to retain metadata of the file on the file server 20 side, but to retain the entity of the file data in the archive server 40 side, not the file server 20 side. If the file server receives a data I/O request, which requires data as the entity of the file with respect to the file converted into stub, from the upper-level program, that file data is sent from the archive system to the file server and written back to the file in the file server. This operation is called recall and the written-back data is called the recall data. The reference from the file system to a page, in which the data of the file is stored, is deleted by converting the file into stub.

The i-node management table of the file system includes a stub flag indicating whether or not the relevant file is converted into stub, a link destination to the recall data, and a storage area for the replicated flag in order to deal with file conversion to stub as shown in FIG. 20.

A variation of the reclamation management table in the processing of file conversion to stub is shown in FIG. 21. The reclamation program refers to the reference flag before the transition and after the transition corresponding to the data deletion operation in the state transition table and updates the reclamation management table to change the reference flag [01] to [11] and change the reference flag [00] to [10]. Specifically speaking, the first bit of the reference flag is changed from [0] (reference is made from the file system) to [1] (no reference is made from the file system) by file conversion to stub.

Next, recall will be explained. When the file system 710 of the file server 40 receives a request to access a file, which is converted into stub, from the upper-level program, the data mover program 708 accesses the data mover program 724 of the archive system and obtains data of the corresponding file on which replication and data migration have been executed.

The data mover program 708 refers to the reclamation management table and stores the recall data in a page whose reference flag is [10]. The reason for doing so is as follows. As shown in FIG. 6, regarding the page whose reference flag is [10], the file system does not refer to the page and the reference from the snapshot to the page remains, so that the page should be a reclamation target. So, COW is caused by writing data to this page to release the reference from the file system to this page, thereby releasing allocation from the snapshot to this page.

On the other hand, while the reference from the snapshot to the page whose reference flag is [10] is released, reference from the file system is newly set. It is necessary to release this page from the reference from the file system in order to reclaim this page. So, data to be recorded in this page may be temporary data that may be deleted from the file system. A preferable example of such data is the recall data.

Even if the file system 710 of the file server obtains a request to access the file, which is converted into stub, from the upper-level program, performs recall, and then deletes the recall data, the recall data exists in the file system 726 of the archive system. So, there will be no problem for the file system 710 of the file server to delete the recall data from the file.

As a result, reclamation of the page to which the file system does not refer and the reference from the snapshot remains is achieved by releasing the reference from both the file system and the snapshot to the page corresponding to the PVOL.

As shown in FIG. 22, the reclamation program refers to the state transition table and detects that the reference flag [10] before the transition changes to [01] after the transition by writing (recalling) data to the PVOL. This is because recalling sets the reference from the file system to the page and COW releases the reference from the snapshot to the page. The reclamation program updates the page with the reference flag [10] to the reference flag [01] in the reclamation management table. The page with the reference flag [10] is a reclamation target, so that it will be hereinafter referred to as the "extra page" for the sake of convenience.

Next, reclamation of the extra page will be explained. When the file system 710 receives a reclamation request, which designates the file system, from the upper-level program, it synchronizes data of files listed in an update list relating to synchronization with data of files in the archive system and then searches the i-node management table for a file whose stub flag is on.

Next, as shown in FIG. 23, the reclamation program obtains a block address (101) of a page whose reference flag is [01] at the block address of the file which is converted into stub. As a result, it is confirmed that the recall data is stored in this page. Furthermore, the reclamation program refers to the reclamation management table and also obtains the block address (103) of a page whose state is [11] and allocation status is [1]. Then, the file server writes 0 data to all the block addresses of the page(s), in which the recall data is recorded, and the unused page(s) and issues a reclamation request to the RAID system.

The reclamation program updates the reclamation management table as shown in FIG. 23. The reclamation program changes the allocation status corresponding to the block address of the reclamation target from [1] to [0]. The state transition table in FIG. 23 shows that the reference flag [01] is changed to the flag [11] after the operation to delete the PVOL data of the relevant block; and the reference flag [11] of the block is not changed even after the reclamation operation.

The reclamation program should preferably execute reclamation on the PVOL immediately before obtaining a snapshot. The snapshot is obtained immediately before periodic fixed time. This is because old data is saved from the PVOL to the DVOL as a result of copy-on-write execution after obtaining the snapshot and blocks which can be reclaimed are accumulated in the PVOL due to file deletions.

Figure 24:
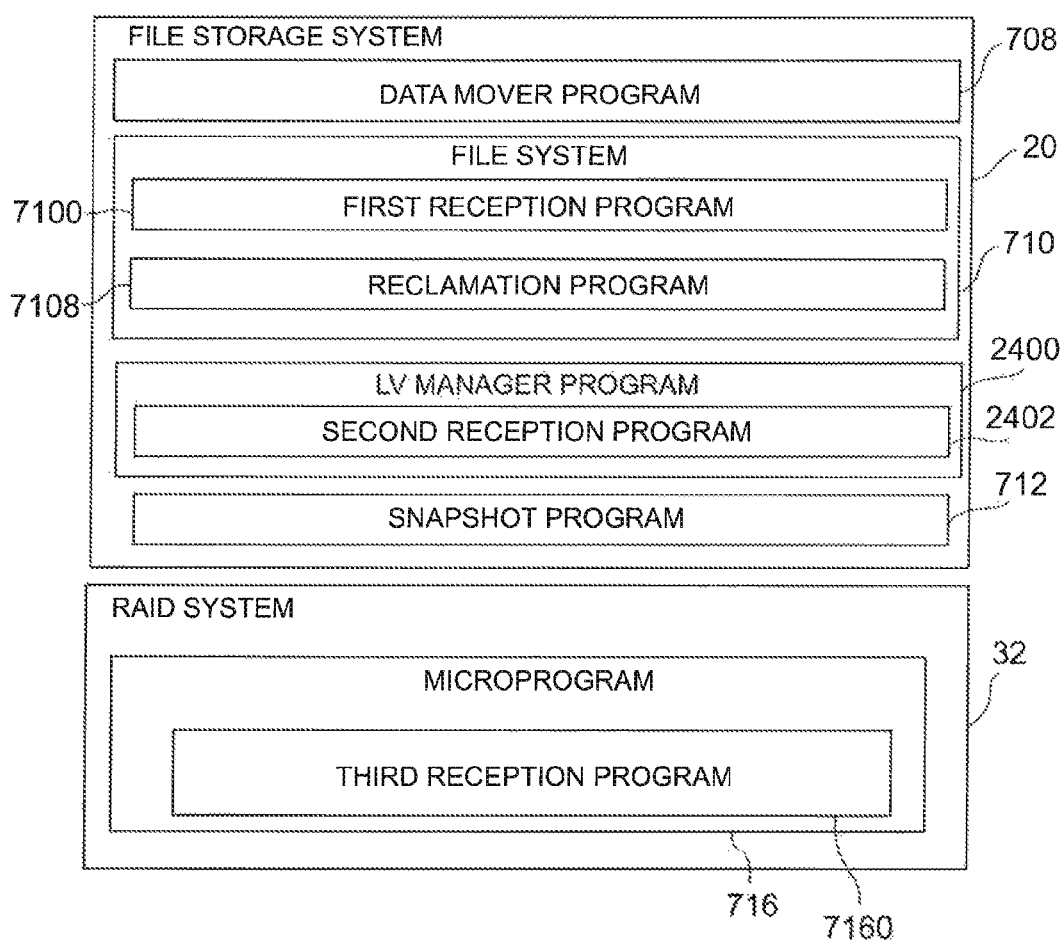
FIG. 24 is a block diagram for explaining the details of the software con-figuration of the computer system according to the present invention.

Next, the operation of the related programs will be explained with reference to the relevant flowcharts. The related programs are as shown in FIG. 6 and flowcharts described below explain programs shown in FIG. 24. Incidentally, a program is an execution subject in the explanation of the flowchart; however, the execution subject of the flowchart is actually a processor that executes the program.

Figure 25:
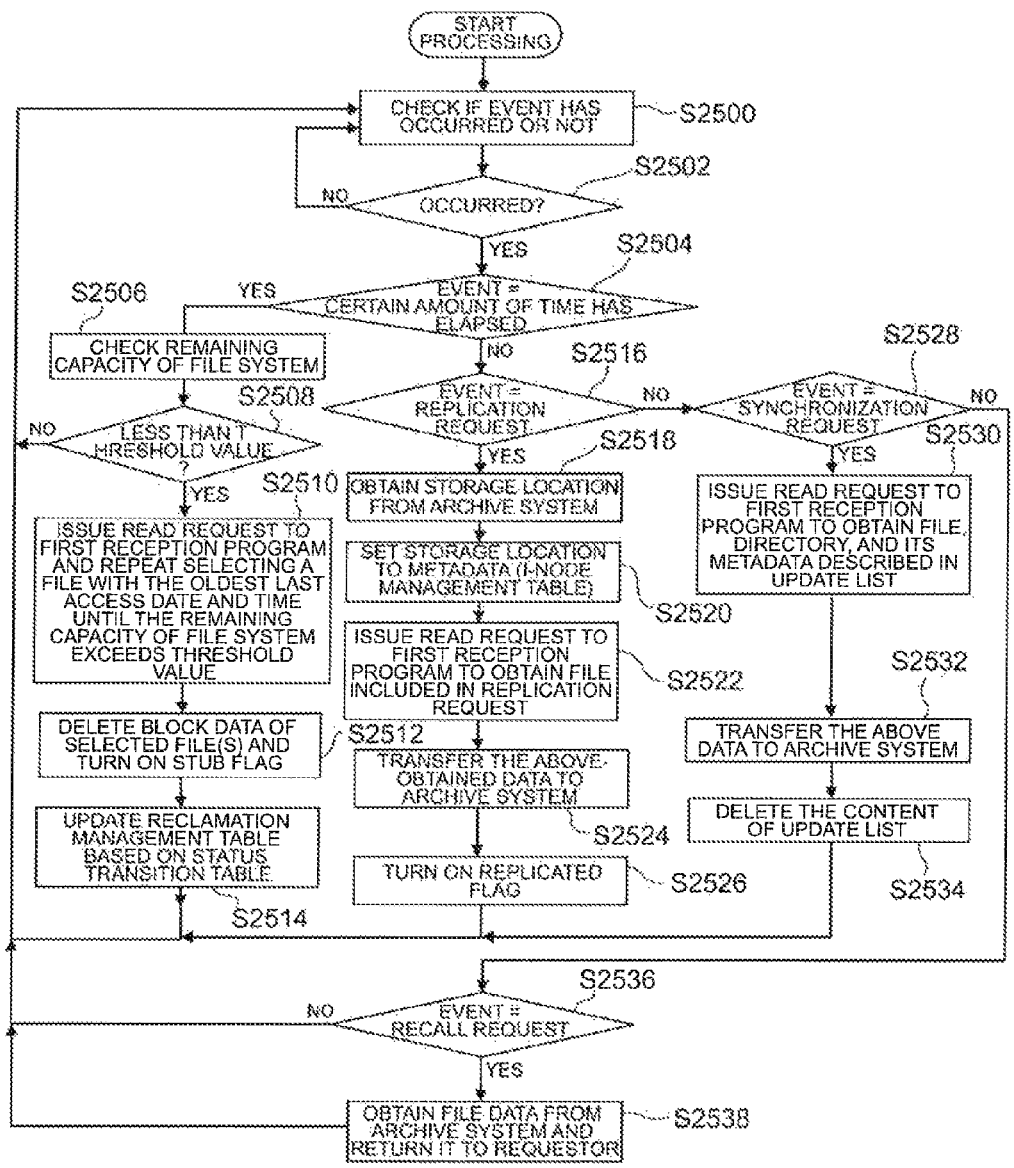
FIG. 25 is an example of a flowchart of a data mover program of the file server.

FIG. 25 is a flowchart of the data mover program 708 of the file server. The data mover program 708 checks whether or not an event which triggers data migration has occurred (S2500). The data mover program checks whether or not event has occurred, based on a command which triggers data migration (S2502). If it is determined that the event has occurred (S2502: YES), the data mover program 708 checks whether or not a certain amount of time has elapsed since the file update (S2504). If an affirmative judgment is returned in this step, the data mover program 708 checks the remaining capacity of the file system (S2506).

If the data mover program determines that the remaining capacity of the file system falls below a threshold value (S2508: YES), it issues a read request to a first reception program (7100 in FIG. 24) of the file system and repeats scanning files sequentially from the oldest last access date and time and selecting a file with the oldest last access date and time until the remaining capacity of the file system exceeds the threshold value (S2510).

Next, the data mover program 708 deletes block data of the selected file (converts the selected file into stub) and turns on the stub flag of that file (S2512). Subsequently, the data mover program 708 updates the reclamation management table based on the state transition table and returns to S2500 (S2514).

If the data mover program 708 determines that the event is not [certain amount of time has elapsed](S2504: NO), it judges whether or not the event is a [replication request] from the upper-level program. If an affirmative judgment is returned in this step (S2516: YES), the data mover program 708 obtains information about a storage location of the replicated file from the archive system 40 (S2518). Then, the data mover program 708 sets the storage location information to metadata (i-node management table) of the replication source file (S2520).

The data mover program 708 sends a read request to the reception program 7100 of the file system in order to obtain the file included in the replication request (S2522). Next, the data mover program 708 transfers data of the obtained file to the archive system (S2524). Furthermore, the data mover program 708 turns on the replicated flag and returns to S2500 (S2526).

If the data mover program determines that the event is not the [replication request](S2516: NO), it judges whether or not the event is a [synchronization request](to synchronize the replication source file with the replication destination file) (S2528). If an affirmative judgment is returned in this step, the data mover program sends a read request to the first reception program 7100 in order to obtain a file, which requires synchronization, from the update list and obtain metadata of that file from the relevant directory (S2530). Subsequently, the data mover program transfers the read data to the archive system (S2532) and deletes the file from the update list and returns to S2500 (S2534).

If the data mover program determines that the event is not the synchronization request (S2528: NO), it judges whether or not the event is a recall request (S2536). If an affirmative judgment is returned in this step, it obtains the recall data from the archive system and delivers it to the upper-level program which is a recall requestor (S2538).

Figure 26:
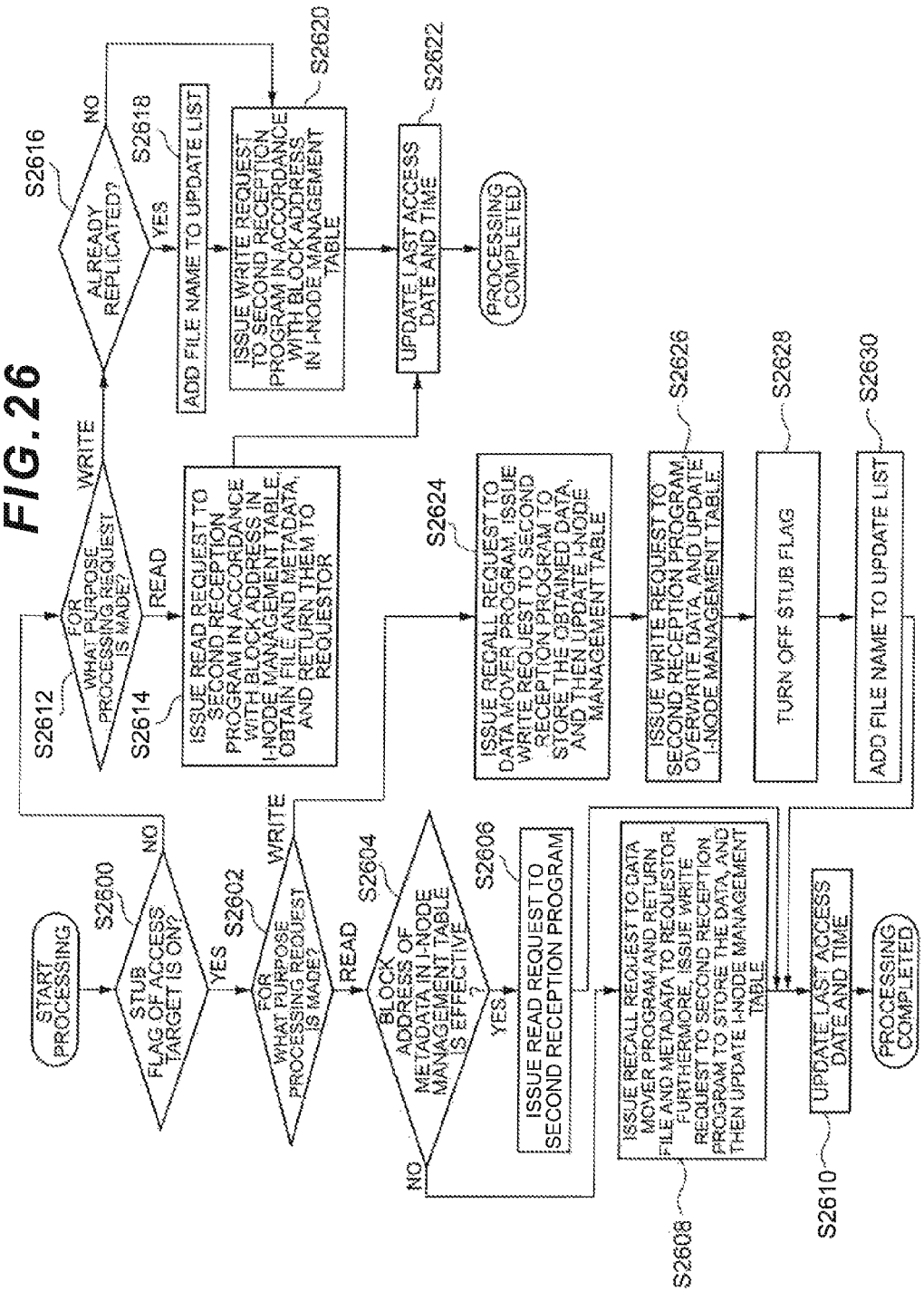
FIG. 26 is an example of a flowchart of a program for receiving file-level access to the PVOL.

Next, the operation of the reception program (first reception program: "7100" in FIG. 24) of the file system 710 will be explained. FIG. 26 is a flowchart illustrating processing executed by the first reception program for making file-level access to the PVOL. Firstly, the first reception program 7100 judges whether the stub flag of an access target file is on or not (S2600).

If an affirmative judgment is returned in this step, the first reception program 7100 judges whether or not an access processing request from the upper-level program 7100 is made to read data or write data (S2602). If the request is made to read data, the first reception program 7100 judges whether or not the block address of metadata in the i-node management table is valid, that is, whether or not data exists at the block address (S2604).

If an affirmative judgment is returned in this step, the first reception program issues a read request to a reception program 2402 of an LV (logical volume) manager program 2400, that is, a program for receiving volume-level access to the PVOL (second reception program: 2402) (S2606).

On the other hand, if a negative judgment is returned in S2604, the first reception program issues a recall request to the data mover program 708 and returns the file and the metadata to the upper-level program which is the requestor. Furthermore, the first reception program issues a recall data write request to the second reception program 2402 in order to store the recall data in the file and updates the i-node management table (S2608). The recall data is written to a page whose reference flag is [10] and allocation status is [1], as described earlier. Then, the first reception program updates the last access date and time in the i-node management table and completes the processing (S2610).

On the other hand, if the first reception program determines that the processing request is made to write data (S2602: YES), it issues a recall request to the data mover program 708, issues a recall data write request to the second reception program 2402 in order to store the recall data, which has been obtained from the archive server 40, in the file, and then updates the i-node management table (S2624).

Subsequently, the first reception program issues a write request to the second reception program 2402 to write the write data, overwrites the file with the write data, and updates the i-node management table (S2626). Then, since the file stub conversion is released by recall, the first reception program changes the stub flag in the i-node management table from on to off (S2628). Next, the first reception program adds a file name to the update list for synchronization (S2630).

If it is determined that the stub flag is off (S2600: NO), the first reception program judges whether the processing request is made to read or write data (S2612). If the first reception program 7100 determines that the processing request is made to read data, it issues a read request to the second reception program 2402 in accordance with the block address in the i-node management table, obtains the file and the metadata, and returns the read data to the upper-level program which is the requestor (S2614). Then, the processing proceeds to S2622.

If the first reception program 7100 determines that the processing request is made to write data (S2612: write), it judges whether the request target file has already replicated or not (S2616). If an affirmative judgment is returned in this step, it is necessary to synchronize the request target file with the replication destination file and the first reception program 7100 adds the file name of the relevant file to the update list (S2618).

Subsequently, the first reception program 7100 issues a write request to the second reception program 2402 in accordance with the block address in the i-node management table (S2620). Finally, the first reception program 7100 updates the last access date and time in the i-node management table and terminates the processing (S2622). If the first reception program 7100 determines that the request target file has not been replicated (S2616: NO), the processing jumps to S2620.

Figure 27:
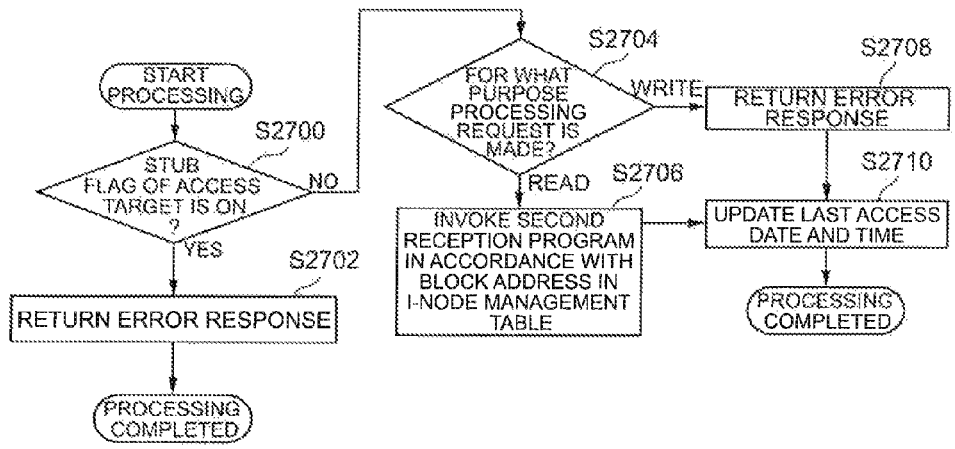
FIG. 27 is an example of a flowchart of a program for receiving file-level access to a snapshot.

FIG. 27 is a flowchart illustrating snapshot access processing executed by the first reception program 7100 which receives file-level access. Firstly, the first reception program judges whether or not the stub flag of an access target file is on (S2700). If the stub flag is on, this means the snapshot cannot refer to data, so that the first reception program returns an error response to the upper-level program (S2702).

On the other hand, if the first reception program determines that the stub flag is off (S2700: NO), it judges whether the processing content is to read data or to write data (S2704). Since snapshots are operated as being read-only, the first reception program 7100 returns an error response for the write request to the upper-level program (S2708). Next, the processing proceeds to S2710.

If the first reception program 7100 determines that the processing request is made to read data (S2704: read), it invokes the second reception program 2402 in accordance with the block address in the i-node management table (S2706), then updates the last access date and time in the i-node management table (S2718), and terminates the flowchart.

Figure 28:
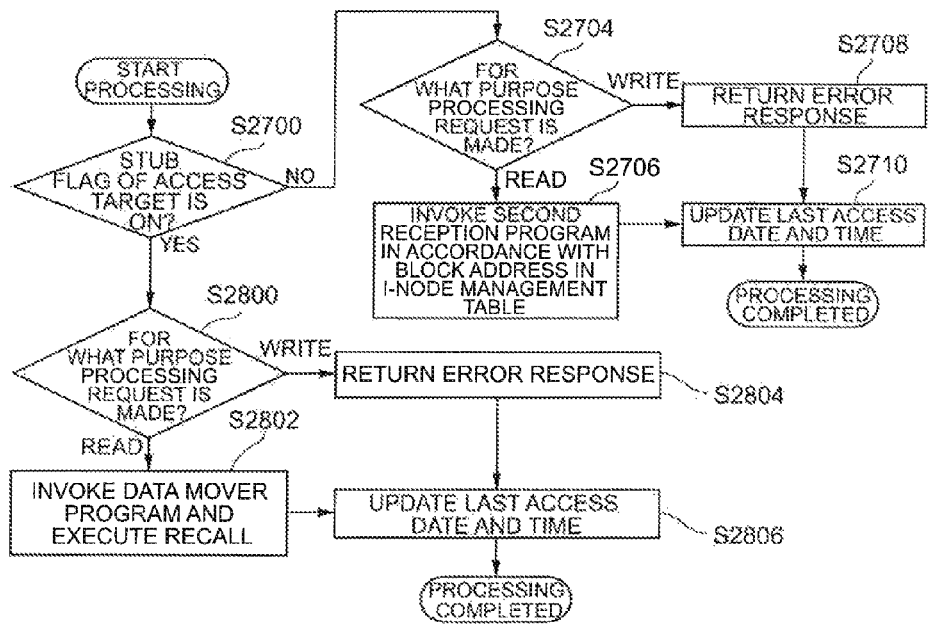
FIG. 28 is a flowchart relating to a variation of FIG. 27.

FIG. 28 is a variation of FIG. 27. Referring to FIG. 27, if the first reception program 7100 determines that the stub flag of an access target snapshot is on, it returns an error response (S2702). On the other hand, referring to the flowchart in FIG. 28, if the first reception program 7100 determines that the processing request is made to read data (S2800), it reads the data mover program. The data mover program executes recall to request the archive system 40 for a file closet to a snapshot acquisition date and time from among a plurality of the same files which are stored in the archive system 40 and whose update dates and times are different (S2802). Therefore, the upper-level program can obtain a file in the form closest to the target snapshot.

Next, the first reception program updates the last access date and time of the obtained file (S2806) and terminates the processing. If the processing request is made to write data (S2800: write), the first reception program returns an error response (S2806).

Figure 29:
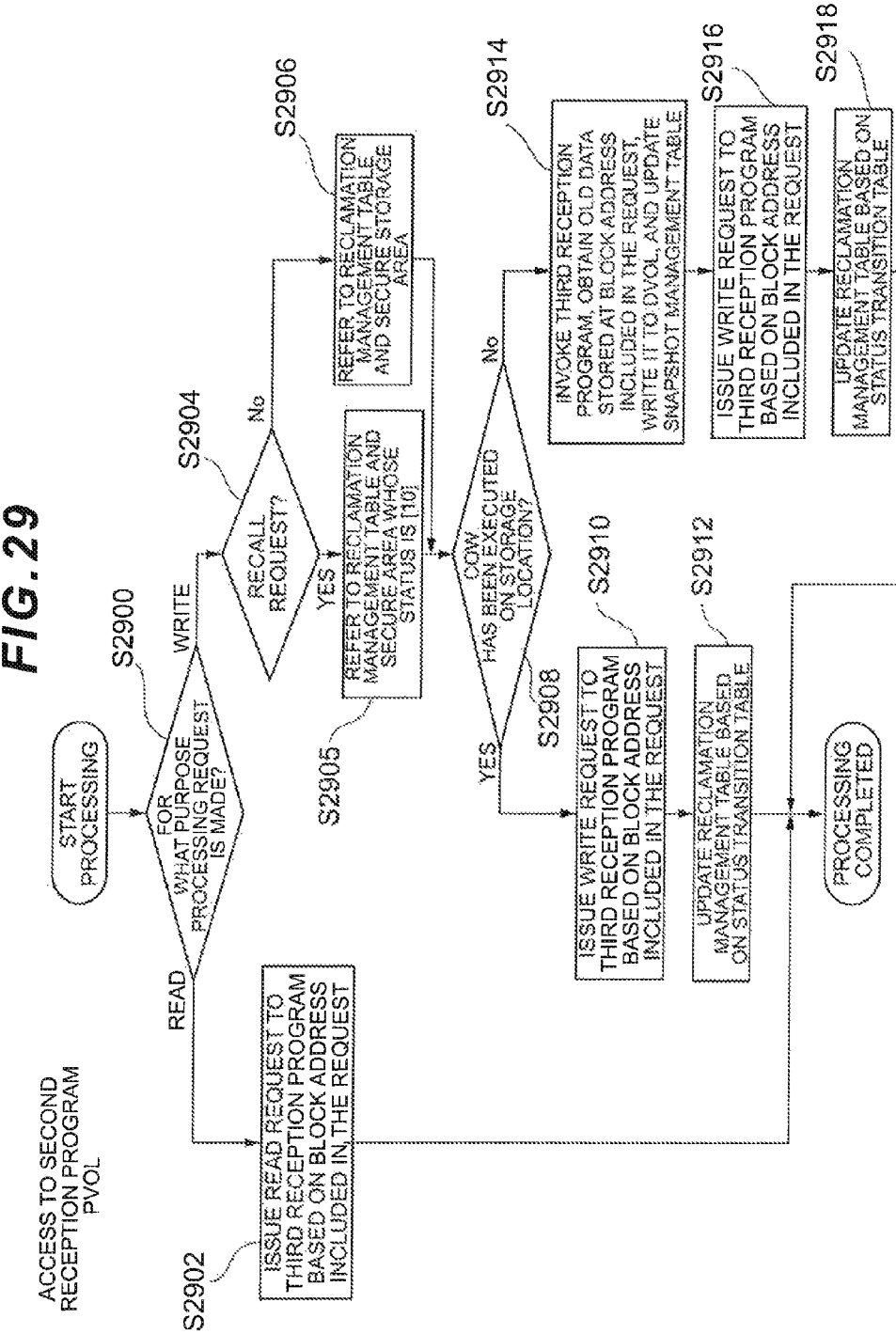
FIG. 29 is an example of a flowchart of a program for receiving volume-level access to the PVOL.

FIG. 29 is a flowchart relating to the operation of the aforementioned second reception program 2402 to receive volume-level access to the PVOL. If it is determined that the processing request from the file system 710 is made to read data (S2900: read), the second reception program 2402 issues a read request to a reception program (third reception program) 7160, which exists in the RAID system and processes block-level access, based on the block address included in the request.

If it is determined that the processing request from the file system 710 is made to write data (S2900: write), the second reception program 2402 judges whether the processing request is a recall request or not (S2904). If it is determined that the processing request is not the recall request (S2904: NO), the second reception program 2402 refers to the reclamation management table and secures a storage area to which the file system does not refer (i.e., whose reference flag is [11]), from among storage areas of the PVOL (S2906).

On the other hand, if it is determined that the processing request is the recall request (S2904: YES), the second reception program 2402 refers to the reclamation management table and secures an area whose reference flag is [10], that is, whose reference from only the file system remains and which requires reclamation (S2905).

Next, the second reception program 2402 judges whether COW has been executed on the data storage location or not (S2908). If an affirmative judgment is returned in this step, the second reception program 2402 issues a write request to the third reception program 7160 based on the block address included in the request (S2910), then updates the reclamation management table based on the state transition table (S2912), and terminates the processing.

On the other hand, if it is determined that COW has not been executed on the data storage location (S2908), the second reception program 2402 invokes the third reception program 7160, obtains old data stored at the block address included in the request, writes it to the DVOL, and updates the snapshot management table (S2914).

Next, the second reception program 2402 issues a write request to the third reception program based on the block address included in the request (S2916). Then, the second reception program 2402 updates the reclamation management table based on the state transition table (S2918).

Figure 30:
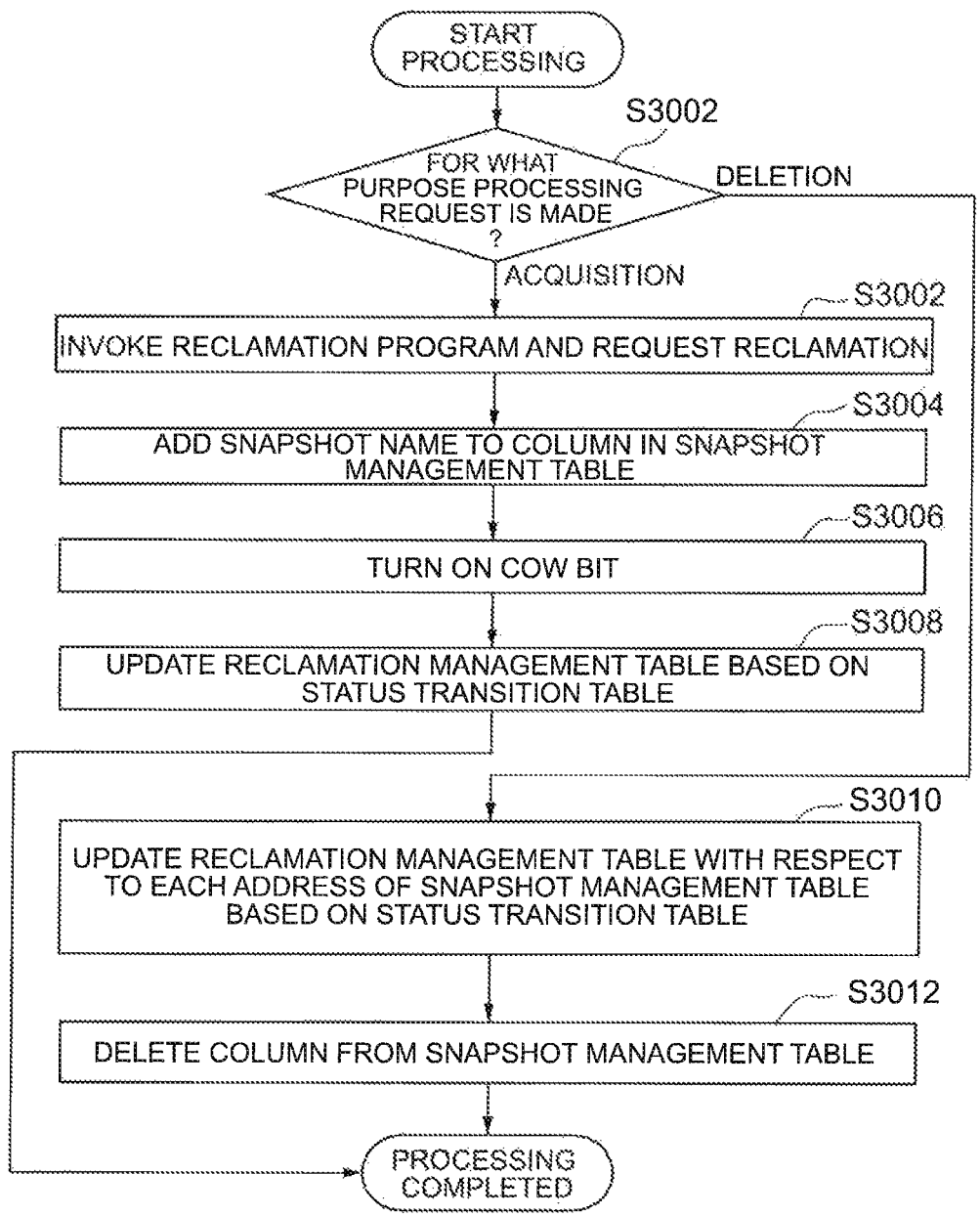
FIG. 30 is an example of a flowchart of a snapshot program for snapshot ac-quisition/deletion.

FIG. 30 is a flowchart of the snapshot program for obtaining/deleting snapshots. This program judges whether a snapshot-related processing request from the upper-level program is made to create a snapshot or delete it (S3000).

If the processing request is made to create a snapshot, the second reception program 2402 invokes the reclamation program and executes reclamation at the timing immediately before creating the snapshot as described earlier (S3002).

Next, the second reception program 2402 adds a snapshot name to the relevant column in the snapshot management table (S3004). Then, the second reception program 2402 turns on the COW bit and sets [1] to each block address in this column (S3006). Furthermore, every time the upper-level program makes write-access to the PVOL, the second reception program 2402 executes COW. When this happens, the second reception program 2402 updates the reclamation management table based on the state transition table (S3008).

If it is determined that the processing request is a deletion request (S3000: deletion), the second reception program 2402 updates the reclamation management table based on the state transition table with respect to each block address of the snapshot management table (S3010). If another snapshot refers to the block address, the state of the reference flag of this block address will not be changed to the state where no reference is made from a snapshot. Then, the second reception program 2402 deletes the relevant column from the snapshot management table (S3012).

Figure 31:
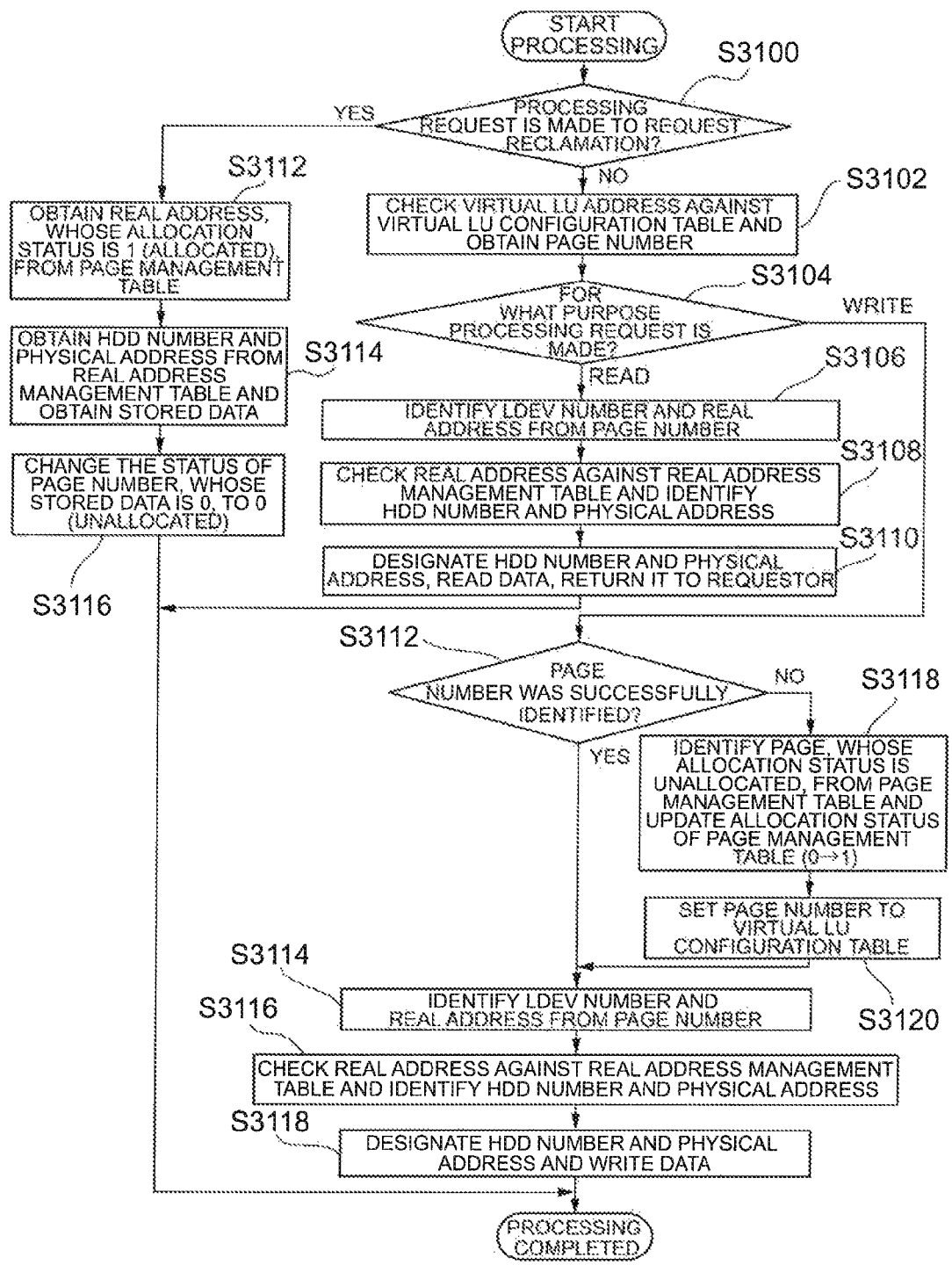
FIG. 31 is a flowchart of a program for receiving block-level access.

FIG. 31 is a flowchart illustrating the operation of the third reception program 716 to receive block-level access. Firstly, the third reception program 716 judges whether a reclamation request has been made from the reclamation program 710 of the file system of the file server 20 (S3100). If an affirmative judgment is returned in this step, the processing proceeds to S3112.

All zero data is recorded in a page to be reclaimed as described earlier. So, the third reception program 716 obtains a real address, whose allocation status is [1] (allocated to the virtual LU), from the page management table (S3112).

Next, the third reception program 716 obtains the HDD number and the physical address from the real address management table and obtains stored data (S3114). Then, the third reception program 716 changes the state of a page with the page number, whose stored data is all zero, to [0] (unallocated to the virtual LU) (S3116) and terminates preparation for the page reclamation.

If it is determined that the processing request is not a reclamation request (S3100: NO), the third reception program 716 checks the virtual LU address included in the processing request against the virtual LU configuration table and obtains the page number (S3102).

Next, if it is determined that the processing request is a read request (S3104: read), the third reception program 716 identifies the LDEV number and the real address from the page number (3106). The third reception program 716 checks the real address against the real address management table and identifies the HDD number and the physical address (S3108). Then, the third reception program 716 reads data by designating the HDD number and the physical address (S3110). The read data is sent to the second reception program 2402 of the file system 710 which is a processing requestor.

If it is determined that the processing request is a write request (S3104: write), the third reception program 716 judges whether the page number has been successfully identified or not (S3112). If an affirmative judgment is returned in this step, the third reception program 716 identifies the LDEV number and the real address from the page number (S3114). Then, the third reception program 716 checks the real address against the real address management table and identifies the HDD number and the physical address (S3116). Furthermore, the third reception program 716 writes data by des-ignating the HDD number and the physical address (S3118).

If it is determined that the page number has not been successfully identified (S3112: NO), the third reception program 716 identifies a page, whose allocation status is UN-ALLOCATED, from the page management table in order to obtain a new page, and updates the allocation status (from 0 to 1) in the page management table (S3118). Then, the third reception program 716 sets the page number to the virtual LU con-figuration table (S3120).

Figure 32:
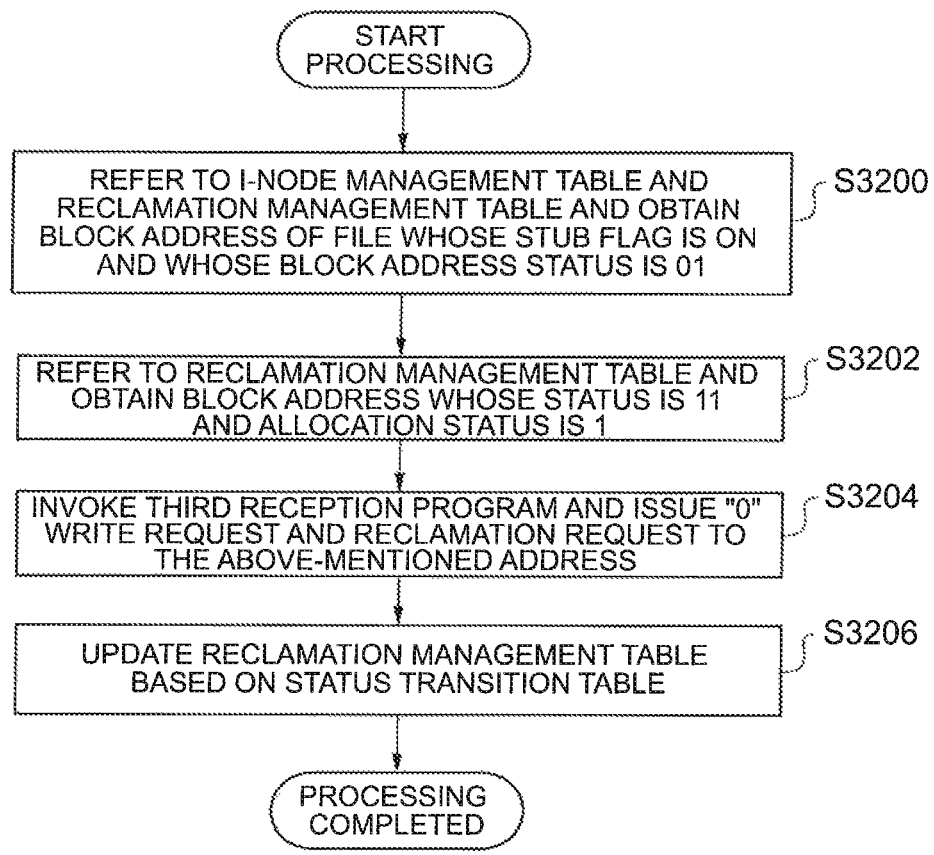
FIG. 32 is a flowchart of a reclamation program.

Next, a flowchart of the reclamation program 710 will be explained with reference to FIG. 32. The reclamation program periodically or always refers to the i-node management table and the reclamation management table and obtains the block address of a file, whose stub flag is on and whose reference flag state of the block address is [01], as a reclamation target (S3200). Then, the reclamation program 710 updates that reference flag to [11].

Subsequently, the reclamation program 710 refers to the reclamation management table and obtains a target block address whose reference flag state is [11] and allocation status is [1] (S3202).

Next, the reclamation program 710 invokes the third reception program 7160, reports the block addresses of the pages obtained in S3200 and S3202, and issues a request to write all [0] data to those target block addresses and then a request to execute the reclamation processing on the pages having those target block addresses to the third reception program (S3204). Furthermore, the reclamation program 710 updates the reclamation management table based on the state transition table (S3206).

Incidentally, if both the used devices of the PVOL and the DVOL are low-speed, large-capacity devices (such as SATA), the advantage of snapshot data migration, that is, the advantage of effective use of high-speed, expensive, and valuable devices (such as SAS or SDD) cannot be enjoyed. Furthermore, there is a possibility that write performance may degrade due to writing to the low-speed devices (SATA), the oc-currence of COW, and allocation by thin provisioning.

Figure 33:
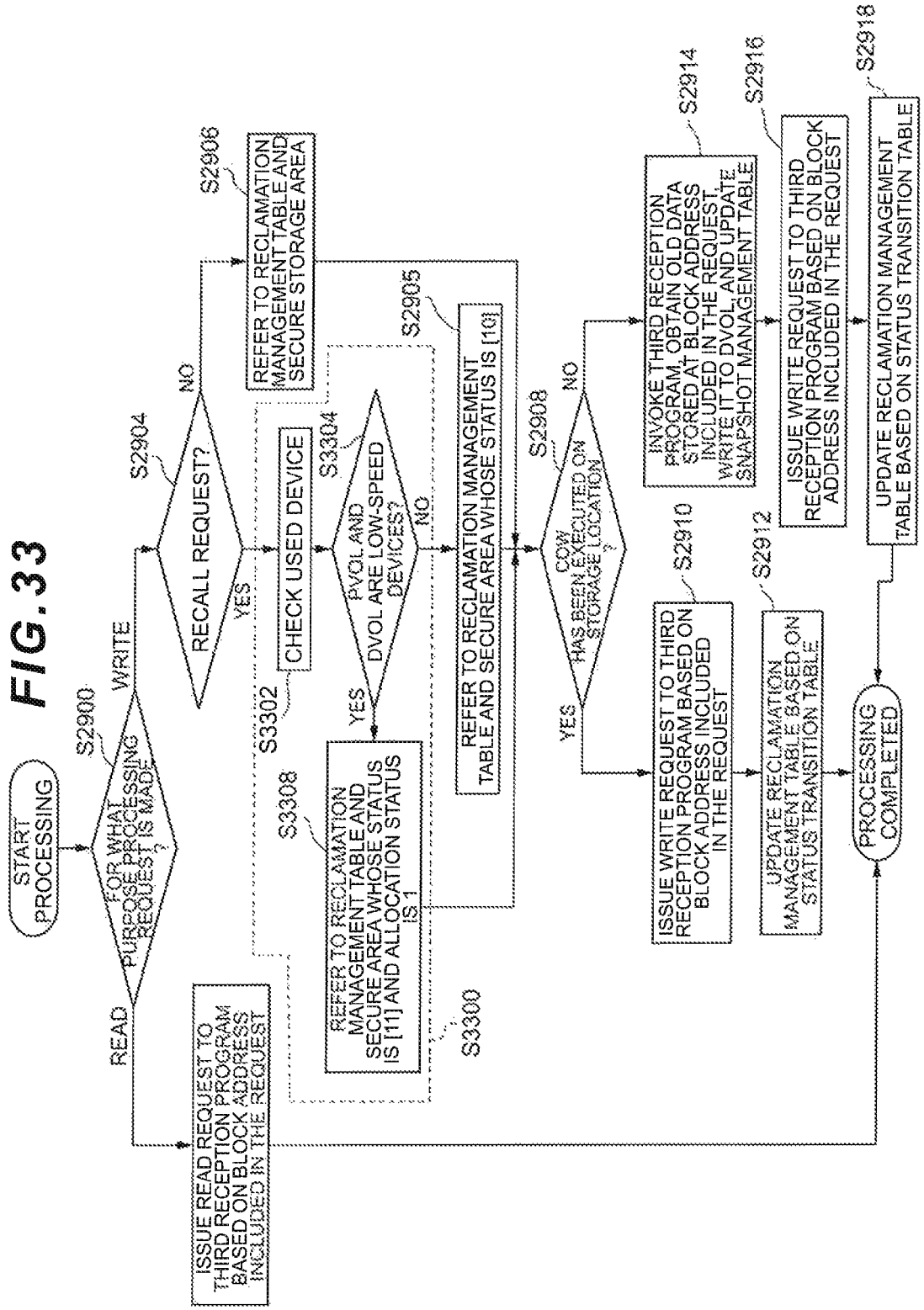
FIG. 33 is a variation of the flowchart in FIG. 29.

The second reception program 2402 is modified as shown in FIG. 33 in order to solve the above-described problem. The part with the reference numeral 3300 is the part added to the flowchart in FIG. 29. The reception program 2402 checks the used devices of the PVOL and the DVOL (S3302); and if the reception program 2402 detects that the low-speed, large-capacity devices such as SATA are used for both the PVOL and the DVOL (S3304), the reception program 2402 writes the recall data to a page which is allocated to the PVOL and to which neither the file system nor the snapshot refers (the allocation status is [1] and the reference flag is [11]) in order to prevent degradation of the write performance. On the other hand, if it is determined that the used devices of the PVOL are the high-speed devices and the used devices of the DVOL are the low-speed devices (S3304: NO), the processing proceeds to S2906.

The aforementioned embodiment uses the recall data as the temporary data; however, the invention is not limited to this example and a temporary file may be stored as the temporary data in a page whose reference flag is [10].

In the aforementioned embodiment, examples of a combination of devices allocated to the PVOL and the DVOL may be ([PVOL: SSD], [DVOL: SAS, SATA]) or ([PVOL: SAS], [DVOL: SATA]).

REFERENCE SIGNS LIST

12 Edge
14 Core
16 Network
18 Host/client
20 File server
22 Storage system
32 RAID system
40 Archive system
32-1 RAID system

The invention claimed is:

1. A computer system comprising:
   a file server for providing a primary volume, which is a data read/write access destination, and a snapshot of the primary volume to a host, wherein the file server includes a difference volume for storing pre-update data of the primary volume; and
   a storage system for setting a virtual volume to the primary volume, allocating a storage block from a pool to the virtual volume in response to write access from the host to the primary volume, and writing data to the storage block;
   wherein if it is determined that there is a specified area of the primary volume to which a file system does not refer and the snapshot refers, the file server stores the pre-update data of the specified area in the difference volume by writing temporary data to a specified storage block corresponding to the specified area among a plurality of storage blocks after obtaining the snapshot, and thereby releases the reference from the snapshot to the specified area; and
   the storage system releases the specified storage block from allocation to the virtual volume.

2. The computer system according to claim 1, wherein if it is determined that the host accesses a specified file whose data is externally stored, the file server recalls the externally-stored data to the specified file and writes the recalled data as the temporary data to the specified area.

3. The computer system according to claim 1, wherein the storage system sets a second virtual volume for the difference volume; and when the file server makes write-access to the specified area of the primary volume, the storage system allocates a storage block from the pool to the second virtual volume and stores the pre-update data in the storage block.

4. The computer system according to claim 2, wherein if the file server determines that a target file of access from the host is the specified file, the file server releases the reference from the file system to the specified area and the storage system then releases the specified storage block from allocation to the virtual volume.

5. The computer system according to claim 4, wherein when the storage system stores a specified data pattern in the specified storage block and releases the specified storage block from allocation to the virtual volume, it detects a storage block having the specified data pattern and sets the detected storage block as the specified storage block.

6. The computer system according to claim 2, wherein the file server replicates a file in an external storage system; and
   if the replicated file satisfies a specified condition, the file server migrates data of the file to the external storage system; and
   the file whose data is migrated is recognized as the specified file.

7. The computer system according to claim 1, wherein the storage system includes a high-speed storage device and a low-speed storage device, allocates the storage block from the high-speed storage device to the primary volume, and allocates the storage block from the low-speed storage device to the difference volume.

8. The computer system according to claim 1, further comprising:
   a first site including a first server, which is the file server, and a first storage system which is the storage system; and
   a second site including a second server, which is an archive server, and a second storage system;

wherein the first server:
converts the file into stub and archives it in the second server;
stores recall data as the temporary data from the second server in the specified area in response to a recall request from the host to the file converted into the stub;
stores old data of the specified area in the difference volume and releases the reference from the snapshot to the specified area; and sets the specified area, in which the recall data is stored, as an area regarding which the reference from a file system of the first server should be released; and wherein the storage system:
stores specified data in the specified storage block corresponding to the specified area; and
releases the specified storage block, in which the specified data exists, from allocation to the virtual volume and returns it to the pool.

9. A reclamation control method for a computer system, the method comprising:
a file server providing a primary volume, which is a data read/write access destination, and a snapshot of the primary volume to a host, wherein the file server includes a difference volume for storing pre-update data of the primary volume; and
a storage system setting a virtual volume to the primary volume, allocating a storage block from a pool to the virtual volume in response to write access from the host to the primary volume, and writing data to the storage block;

wherein if it is determined that there is a specified area of the primary volume to which a file system does not refer and the snapshot refers, the file server stores the pre-update data of the specified area in the difference volume by writing temporary data to a specified storage block corresponding to the specified area among a plurality of storage blocks after obtaining the snapshot, and thereby releases the reference from the snapshot to the specified area; and the storage system releases the specified storage block from allocation to the virtual volume.

* * * * *